US009537680B2

(12) United States Patent
Wolcott et al.

(10) Patent No.: US 9,537,680 B2
(45) Date of Patent: *Jan. 3, 2017

(54) INDUCING RESPONSE SIGNATURES IN A COMMUNICATION NETWORK

(71) Applicant: Comcast Cable Communications, LLC, Philadelphia, PA (US)

(72) Inventors: Lawrence D. Wolcott, Denver, CO (US); Phillip F. Chang, Langhorne, PA (US); Bryan Scott Johnston, Eugene, OR (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,429

(22) Filed: Jan. 7, 2015

(65) Prior Publication Data

US 2015/0256430 A1 Sep. 10, 2015

Related U.S. Application Data

(63) Continuation of application No. 13/155,464, filed on Jun. 8, 2011, now Pat. No. 8,971,394, which is a
(Continued)

(51) Int. Cl.
*H04L 27/10* (2006.01)
*H04L 25/03* (2006.01)
*H04L 12/24* (2006.01)

(52) U.S. Cl.
CPC ... *H04L 25/03019* (2013.01); *H04L 25/03343* (2013.01); *H04L 41/12* (2013.01);
(Continued)

(58) Field of Classification Search
CPC .......... H04L 25/03019; H04L 25/03343; H04L 41/12; H04L 2025/03471; H04L 2025/03808; H04L 63/00; H04L 63/04; H04L 63/0414; H04L 63/08; H04L 63/0876; H04L 63/12; H04L 63/126; H04W 12/00; H04W 12/02; H04W 12/08
See application file for complete search history.

(56) References Cited

U.S. PATENT DOCUMENTS

| 5,311,546 A | 5/1994 | Paik et al. |
| 5,881,108 A | 3/1999 | Herzberg et al. |

(Continued)

FOREIGN PATENT DOCUMENTS

JP 04208707 B2 1/2009

OTHER PUBLICATIONS

"VSWR, or Voltage Standing Wave Ratio", available at http://emc.loprudderconn/vswr.pdf (last visited Nov. 22, 2010).
(Continued)

*Primary Examiner* — Morshed Mehedi
*Assistant Examiner* — Ayoub Alata
(74) *Attorney, Agent, or Firm* — Banner & Witcoff, Ltd.

(57) ABSTRACT

Methods and systems are provided in which a network induces different distortions in signals traversing different segments of the network. The distortions may be used to identify locations on the network of devices that transmit and receive the signals. The distortions may be reflected in equalization coefficients programmed into transmitting or receiving devices, which may be used to pre or post filter the signals to compensate for the distortions.

20 Claims, 32 Drawing Sheets

Related U.S. Application Data continuation-in-part of application No. 12/917,001, filed on Nov. 1, 2010, now Pat. No. 8,856,535.

(60) Provisional application No. 61/301,835, filed on Feb. 5, 2010.

(52) U.S. Cl.
CPC ............... *H04L 2025/03471* (2013.01); *H04L 2025/03808* (2013.01)

(56) References Cited

U.S. PATENT DOCUMENTS

| | | | |
|---|---|---|---|
| 6,377,810 B1 | 4/2002 | Geiger et al. | |
| 6,434,193 B1 | 8/2002 | Fukuoka | |
| 6,556,239 B1 | 4/2003 | Al-Araji et al. | |
| 6,671,334 B1 | 12/2003 | Kuntz et al. | |
| 6,728,887 B1 | 4/2004 | Dziekan et al. | |
| 6,862,315 B1 | 3/2005 | Garg et al. | |
| 6,880,170 B1 | 4/2005 | Kauffman et al. | |
| 6,947,502 B2* | 9/2005 | Taylor | H04B 1/71057 375/340 |
| 6,947,741 B2 | 9/2005 | Beech et al. | |
| 7,142,609 B2 | 11/2006 | Terreault et al. | |
| 7,574,492 B2 | 8/2009 | Karaoguz et al. | |
| 7,742,777 B2 | 6/2010 | Strater et al. | |
| 7,843,847 B2* | 11/2010 | Quigley | H04L 1/203 370/252 |
| 8,143,900 B2 | 3/2012 | Shimp et al. | |
| 8,284,828 B2 | 10/2012 | Cooper et al. | |
| 8,416,697 B2 | 4/2013 | Wolcott et al. | |
| 8,458,759 B2 | 6/2013 | Zinevich | |
| 8,576,705 B2 | 11/2013 | Thibeault et al. | |
| 8,650,602 B2 | 2/2014 | Pond et al. | |
| 8,787,223 B2 | 7/2014 | Watson et al. | |
| 8,829,916 B2 | 9/2014 | Defoort et al. | |
| 2001/0017904 A1 | 8/2001 | Pukkila et al. | |
| 2003/0058786 A1 | 3/2003 | Sato et al. | |
| 2003/0109999 A1 | 6/2003 | Stein et al. | |
| 2003/0191856 A1 | 10/2003 | Lewis et al. | |
| 2003/0217122 A1* | 11/2003 | Roese | G01S 5/02 709/219 |
| 2004/0100881 A1 | 5/2004 | Wakabayashi et al. | |
| 2004/0145470 A1 | 7/2004 | Fager et al. | |
| 2004/0153898 A1 | 8/2004 | Hidaka | |
| 2004/0222908 A1 | 11/2004 | MacDonald et al. | |
| 2005/0207346 A1 | 9/2005 | Chu et al. | |
| 2005/0226421 A1* | 10/2005 | Briancon | H04L 63/12 380/270 |
| 2006/0007997 A1* | 1/2006 | Jones | H04L 25/03343 375/231 |
| 2006/0121946 A1 | 6/2006 | Walton et al. | |
| 2006/0271986 A1 | 11/2006 | Vogel | |
| 2007/0109995 A1 | 5/2007 | Quigley et al. | |
| 2007/0211618 A1 | 9/2007 | Cooper et al. | |
| 2007/0288982 A1 | 12/2007 | Donahue | |
| 2008/0080607 A1 | 4/2008 | Shah | |
| 2008/0089224 A1 | 4/2008 | Kim et al. | |
| 2008/0129421 A1* | 6/2008 | Ninan | H01P 1/203 333/205 |
| 2008/0192816 A1 | 8/2008 | Momtaz | |
| 2008/0276111 A1 | 11/2008 | Jacoby et al. | |
| 2009/0007210 A1 | 1/2009 | Nishide et al. | |
| 2009/0268799 A1 | 10/2009 | Wang et al. | |
| 2009/0304065 A1 | 12/2009 | Choi et al. | |
| 2010/0095360 A1* | 4/2010 | Pavlovski | H04L 63/18 726/7 |
| 2010/0142608 A1 | 6/2010 | Kim et al. | |
| 2010/0158093 A1* | 6/2010 | Thompson | H04B 17/0085 375/227 |
| 2010/0183258 A1 | 7/2010 | Chow et al. | |
| 2010/0185865 A1 | 7/2010 | Yeap et al. | |
| 2010/0223650 A1 | 9/2010 | Millet et al. | |
| 2011/0026577 A1 | 2/2011 | Primo et al. | |
| 2011/0110415 A1 | 5/2011 | Cooper et al. | |
| 2015/0318937 A1 | 11/2015 | Ruth et al. | |

OTHER PUBLICATIONS

Melissa Ray Weimer, "Waveform Analysis Using the Fourier Transform", DATAQ Instruments, Inc., available at http:!/www.dataq.com/applicat/articles/an11.htm (last visited Nov. 22, 2010).

Rob Thompson, et al., "Optimizing Upstream Throughput Using Equalization Coefficient Analysis", National Cable & Telecommunications Association (NCTA) Technical Papers, Apr. 2009.

Robert L. Howald et al., "Characterizing and Aligning the HFC Return Path for Successful DOCSIS 3.0 Rollouts", SCTE Cable-Tee Expo, Denver, CO, Oct. 28-30, 2009.

Robert L. Howald et al., "Docsis 3.0 Upstream: Readiness & Qualification," SCTE Cable-Tec Expo, Oct. 2009.

DOCSIS® Best Practices and Guidelines Proactive Network Maintenance Using Preequalization CM-GL-PNMP-V01-100415;Apr. 15, 2010.

CableLabs invention disclosure titled "Pre-Equalization based proactive network maintenance process model"; prior to Nov. 1, 2010.

Hranac, R., "Linear Distortions part 1 ," downloaded Apr. 22, 2010.

Qureshi, S.U.H., "Adaptive Equalization," Proceedings of the IEEE, Sep. 1985.

CableLabs invention disclosure titled "A Simple algorithm for fault localization using naming convention and micro-reflection signature"; prior to Nov. 1, 2010.

* cited by examiner group delay v. frequency - - cluster 5 group delay v. frequency - - cluster 6 group delay v. frequency - - cluster 7 group delay v. frequency - - cluster 8 phase delay v. frequency - - cluster 9 phase delay v. frequency - - cluster 10 phase delay v. frequency - - cluster 11 phase delay v. frequency - - cluster 12

| Index (151) | AD Identifier (152) | Tap 1 (153-1) | | Tap 2 (153-2) | | ... | Tap P (153-P) | | ... |
| --- | --- | --- | --- | --- | --- | --- | --- | --- | --- |
| | | r | i | r | i | | r | i | |
| 00001 | <MAC addr. for 51-1> | <r> | <i> | <r> | <i> | ... | <r> | <i> | ... |
| 00002 | <MAC addr. for 51-2> | <r> | <i> | <r> | <i> | ... | <r> | <i> | ... |
| 00003 | <MAC addr. for 51-3> | <r> | <i> | <r> | <i> | ... | <r> | <i> | ... |
| ⋮ | ⋮ | ⋮ | ⋮ | ⋮ | ⋮ | | ⋮ | ⋮ | |
| N | <MAC addr. for 51-N> | <r> | <i> | <r> | <i> | ... | <r> | <i> | ... |

FIG. 5A

| Index (151) | AD Identifier (152) | ... | Amplitude v. frequency approximated signature data (154) | ... |
| --- | --- | --- | --- | --- |
| 00001 | <MAC addr. for 51-1> | ... | 06:A1:A2:A3:A4:A5:A6 | ... |
| 00002 | <MAC addr. for 51-2> | ... | | ... |
| 00003 | <MAC addr. for 51-3> | ... | | ... |
| ⋮ | ⋮ | | ⋮ | |
| N | <MAC addr. for 51-N> | ... | | ... |

| Index [151] | AD Identifier [152] | ... | Group delay v. frequency approximated signature data [155] | ... |
|---|---|---|---|---|
| 00001 | <MAC addr. for 51-1> | ... | <gd/f resp. sig. approx.> | ... |
| 00002 | <MAC addr. for 51-2> | ... | | ... |
| 00003 | <MAC addr. for 51-3> | ... | | ... |
| ⋮ | ⋮ | | ⋮ | |
| N | <MAC addr. for 51-N> | ... | | ... |

| Index [151] | AD Identifier [152] | ... | Phase delay v. frequency approximated signature data [156] | ... |
|---|---|---|---|---|
| 00001 | <MAC addr. for 51-1> | ... | <pd/f resp. sig. approx.> | ... |
| 00002 | <MAC addr. for 51-2> | ... | | ... |
| 00003 | <MAC addr. for 51-3> | ... | | ... |
| ⋮ | ⋮ | | ⋮ | |
| N | <MAC addr. for 51-N> | ... | | ... |

FIG. 5D group delay v. frequency phase delay v. frequency

INDUCING RESPONSE SIGNATURES IN A COMMUNICATION NETWORK

CROSS-REFERENCE TO RELATED APPLICATIONS

This application is a continuation of U.S. patent application Ser. No. 13/155,464, filed Jun. 8, 2011, which is a continuation-in-part application of U.S. patent application Ser. No. 12/917,001, filed Nov. 1, 2010, which claims the benefit of Provisional U.S. Patent Application Ser. No. 61/301,835, filed Feb. 5, 2010. U.S. patent application Ser. Nos. 13/155,464, 12/917,001 and No. 61/301,835, are incorporated in their entireties by reference herein.

BACKGROUND

Many communication networks include multiple individual access devices communicating with a hub device. Anomalies in a path between an access device and a hub can impair signal transmission. Although various methods for compensating for such anomalies are known, there remains a need for improved analysis techniques.

SUMMARY

This Summary is provided to introduce a selection of concepts in a simplified form that are further described below in the Detailed Description. This Summary is not intended to identify key features or essential features of the disclosure.

A system is provided, which includes an access network having a number of different communication paths. In at least some embodiments, an analyzer can obtain data regarding signal characteristics in each of multiple communication channels within an access network. Each channel may be associated with an individual access device and can represent a physical path from that individual access device to a termination system or other type of hub. The access network may include multiple different segments separated by amplifiers, signal combiners/splitters and other hardware, and each physical path may traverse a number of the segments. Different communication paths may share some segments, and may have other segments, which are unique to just that communication path.

In various embodiments, the analyzer can use the obtained data to create signatures corresponding to each of the multiple channels. Based on similarities between signatures, the analyzer may then identify clusters of signatures associated with devices that share channels or portions of channels. These signature clusters can be used to diagnose and locate network problems, to identify unauthorized and/or unprovisioned devices, and/or for other purposes. Other embodiments are discussed below.

In other various embodiments, signal distortions may be intentionally introduced within the different segments of the access or distribution network using filters such as tunable notch filters, which may be inserted into the amplifiers between the segments. The signal distortions are such that each segment may introduce a different unique and distinguishable distortion. Within the system, an analyzer may obtain, for each of the multiple communication paths, data regarding signal characteristics, which reflect the signal distortions of every segment that communication path traverses. Using known physical locations of the notch filters and the distinguishable signal characteristics of each communication path, an access device may be physically located. Other embodiments are discussed below.

In further embodiments, a momentary signal distortion may be induced on a particular network segment. In such embodiments, momentary changes in the signature or signature approximation of an access device may be detected to determine if the access device is located in the segment on which the momentary distortion is introduced or in a segment downstream from the segment on which the momentary distortion is introduced.

BRIEF DESCRIPTION OF THE DRAWINGS

FIGS. 5A-5E shows portions of a database used by an analyzer according to some embodiments.

DETAILED DESCRIPTION

FIGS. 1A-1M illustrate channel signatures and signature clusters for communications between access devices and a hub in an access network. In the example of FIGS. 1A-1M, the access devices are modems (e.g., cable modems) and the hub is a termination system (e.g., a cable modem termination system (CMTS)) in an access network, such as a hybrid fiber coaxial (HFC) access network. Although some embodiments are described in the context of communications (e.g., upstream communications) between modems and a termination system in an access network, other embodiments include different types of access devices (e.g., fiber optic modems, wireless transceivers, gateways, set top terminals, digital video recorders), different types of hubs (e.g., other types of termination systems, optical line terminals, wireless base stations, satellites), and/or different types of networks. Such networks may use any of numerous communication protocols. Such networks may also utilize various different types of physical communication media (e.g., twisted pair conductors, wireless RF communications, fiber optical link, etc.). Examples of such other networks in other embodiments include fiber optic, satellite and other wireless communication networks, digital subscriber line (DSL) networks, etc.

Figure 1A:
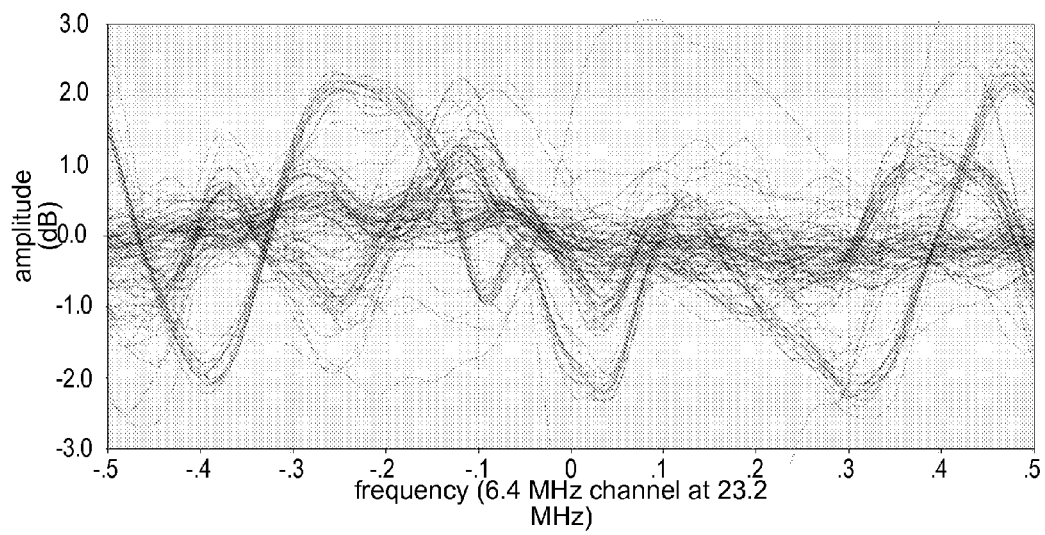
FIGS. 1A-1M are graphs illustrating multiple frequency response signatures for communication paths in an access network.
Figure 1B:
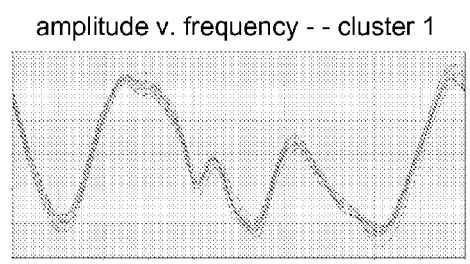

FIG. 1A shows multiple waveforms superimposed on one another. Each waveform in FIG. 1A is associated with a different one of multiple access devices communicating with a hub. Specifically, each waveform is a graphical representation of an amplitude versus frequency response (or "amplitude/frequency response") signature for upstream communications from the associated access device to the hub. Each signature therefore also corresponds to a specific communication path between the associated access device and the hub. The vertical axis in the graph of FIG. 1A represents signal power in decibels (dB). In the example of FIGS. 1A-1M, that carrier is a 6.4 MHz channel centered at 23.2 MHz. The horizontal axis of FIG. 1A represents negative and positive deviations from that center frequency, with the center frequency shown as "0" on the horizontal axis. As explained in more detail below, each signature represented in FIG. 1A is derived from a fast Fourier transform (FFT) of the pre-equalization coefficients for the associated access device. The horizontal axis of FIG. 1A is divided into units of frequency. In particular, each unit on the horizontal axis represents 0.1 (or 10%) of the spectrum being analyzed. In the case of the 6.4 MHz channel of FIGS. 1A-1M, 5.12 MHz of channel alpha is used. The remainder (1.28 MHz) is disregarded due to roll-off effect near the channel edges.

As seen in FIG. 1A, an amplitude/frequency response signature can include multiple wave-like ripples of varying size and having different positions relative to the center frequency. Ripples in a response signature associated with a particular access device often result from some type of damage, imperfection or other anomaly in the physical communication path between that associated access device and the termination system or other hub. Examples of such imperfections can include loose or missing connectors, corroded couplers, corroded connections, impedance mismatches from incorrectly selected components, internal modem filters, a damaged cable section, and idiosyncratic frequency responses of filters or other components. The number of ripples in a signature, as well as the height, width and position of each ripple can be affected by the number, type(s), severity and location(s) of anomalies in the communication path corresponding to that signature.

Because a response signature is affected by anomalies in the corresponding communication path, a response signature can often be used to distinguish one or more paths in a network from other paths in that same network. In some cases, for example, each access device in a set of access devices may have a unique communication path to a hub. However, each of those paths may include a portion used by a single one of those devices and portions shared with other devices. As one illustration, each of multiple access devices in a neighborhood may have a communication path to a hub that includes a first portion used only by that access device (e.g., a tap line to an individual residence), a second portion shared with a small number of other devices (e.g., a feeder line serving devices on a particular street), a third portion serving a larger set of devices (e.g., a trunk line serving devices on several streets), etc. An anomaly in one of those shared network portions will often cause the access devices using that shared portion to have associated response signatures that are similar to one another. However, those response signatures may be distinguishable from signatures associated with devices not using the shared network portion. By finding similarities between response signatures and the extent to which those similarities apply to other devices, the likely location of a plant anomaly can be determined For example, similar signatures associated with access devices in a neighborhood, but not associated with devices in adjacent neighborhoods, suggest an anomaly in a tap or other plant element serving only that neighborhood.

Figure 1C:
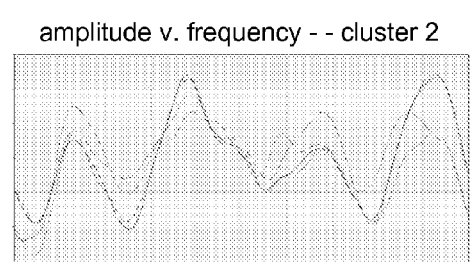
Figure 1D:
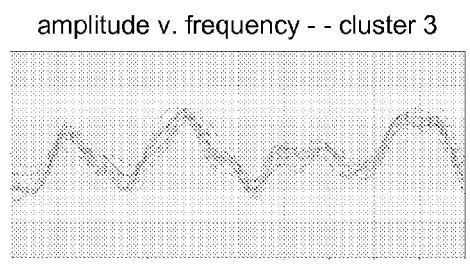

Similarities among different collections of response signatures are illustrated in FIGS. 1B-1E. For example, a portion of the signatures from FIG. 1A having a first general shape are separately shown as cluster 1 in FIG. 1B. Each of the cluster 1 signatures has the same number of ripples. Moreover, the sizes and positions of ripples in each of the cluster 1 signatures are very similar to the sizes and positions of ripples in the other cluster 1 signatures. Another subset of the signatures from FIG. 1A having a second general shape is shown as cluster 2 in FIG. 1C, with each of the cluster 2 signatures being very similar in number, size and position of ripples. Yet another cluster of the signatures from FIG. 1A having a third general shape is shown in FIG. 1C as cluster 3. Based on the similarity of the signatures within each of clusters 1-3, the access devices associated with signatures in a particular cluster likely share a significant portion of a communication path. Using knowledge of the physical plant in the network and/or the location of one or more access devices associated with a particular cluster, the likely location of other access devices associated with that cluster and/or of plant anomalies can be accurately estimated.

In some cases, a large portion of signatures in an access network may have relatively few ripples. For example, a large subset of signatures having relatively small ripples are concentrated as a horizontal "rope" of signatures at the center of FIG. 1A. These signatures are shown separately as cluster 4 in FIG. 1E. As explained in further detail below, however, analysis parameters can be adjusted to further distinguish between signatures and/or sub-clusters of signatures within cluster 4.

The same data used to generate amplitude/frequency response signatures for individual access devices can be used to generate other types of response signatures. Those other signature types can also be used to distinguish among communication paths in a network. For example, an FFT of the pre-equalization coefficients of the cable modems associated with FIG. 1A can also be used to create a group delay vs. frequency response signature for each of those cable modems. "Group delay" (GD) can be defined as the negative derivative of phase with respect to frequency, expressed mathematically as $GD=-(d\phi/d\omega)$ and having units of time such as nanoseconds, and represents a measure of the extent to which signals at some frequencies travel faster than signals at other frequencies. As another example, an FFT of those same pre-equalization coefficients can further be used to create a phase delay vs. frequency response signature for each of those cable modems. "Phase delay" can be defined as the time delay (e.g., in nanoseconds) experienced by each sinusoidal component of an input signal. As with an amplitude/frequency response signature, the numbers, sizes and positions of ripples in a group delay/frequency response signature or in a phase delay/frequency response signature can be affected by the number, type(s), severity and location(s) of anomalies in a communication path. However, some anomalies may have different effects on different types of frequency response signatures.

FIGS. 1F-1I show four clusters of group delay/frequency response signatures generated using the same data used to create the amplitude/frequency response signatures of FIGS. 1A-1E. All of the signatures in cluster 5 (FIG. 1F) generally have the same number of ripples, with those ripples having similar sizes and positions in each cluster 5 signature. The same is true with regard to the signatures in clusters 6 (FIG. 1G) and 7 (FIG. 1H), with cluster 8 including signatures in a concentrated rope similar to that of FIG. 1E. Although each of the group delay/frequency response signatures in clusters 5-8 is associated with a cable modem (and corresponds to a communication path) for which an amplitude/frequency response signature is included in FIG. 1A, the associations of cable modems in clusters 1-4 is not necessarily the same as the associations of cable modems in clusters 5-8. For example, a cable modem might be associated with an amplitude/frequency response signature in cluster 4 but be associated with a group delay/frequency response signature in one of clusters 5, 6 or 7.

FIGS. 1J-1M show four clusters of phase delay/frequency response signatures also generated using the same data used to create the amplitude/frequency response signatures of FIGS. 1A-1E. Within each of clusters 9 (FIG. 1J), 10 (FIG. 1K) and 11 (FIG. 1L), each of the cluster signatures generally has the same number of ripples and has ripples of similar sizes and positions. Cluster 12 includes signatures in a concentrated rope similar to that of FIG. 1E. Although each of the phase delay/frequency response signatures in clusters 9-12 is associated with a cable modem (and corresponds to a communication path) for which an amplitude/frequency response signature is included in FIG. 1A, and for which a group delay/frequency response signature may be included in one of FIGS. 1F-1I, the association of cable modems in clusters 9-12 is not necessarily the same as the associations of cable modems in clusters 1-4 or in clusters 5-8.

Figure 2:
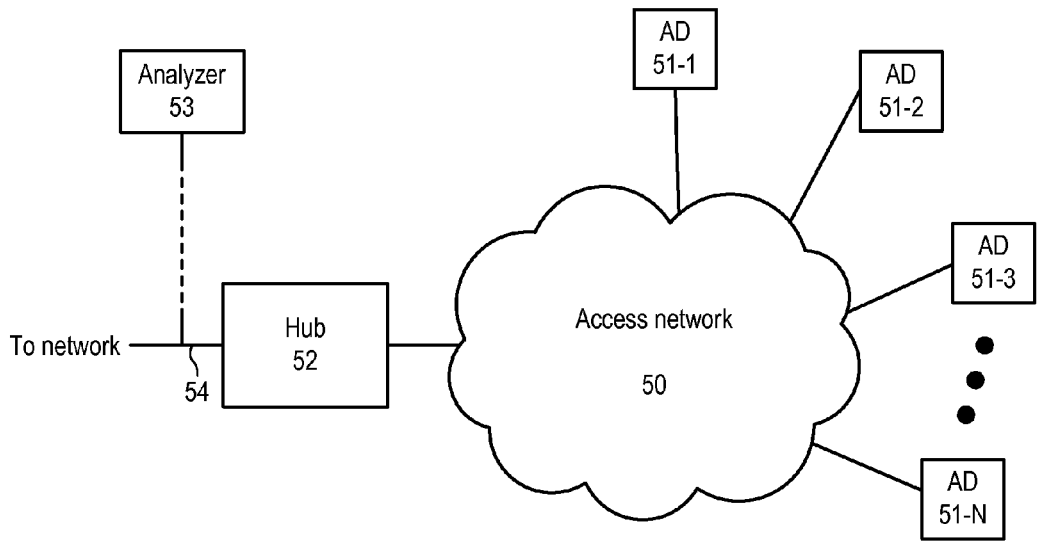
FIG. 2 is a block diagram showing elements in an access network in which some embodiments may be practiced.

FIG. 2 is a block diagram showing elements in an exemplary access network 50 according to some embodiments. Each of multiple access devices (AD) 51-1 through 51-N communicates with a hub 52 across a particular path through network 50. Each of devices 51-1 through 51-N may share a large part of its communication path to hub 52 with a relatively small portion of the other devices 51-1 through 51-N (e.g., access devices on the same street, on the same building floor, or otherwise in the same relatively small geospatial region). Each of devices 51-1 through 51-N may share a slightly smaller part of its communication path to hub 52 with a slightly larger portion of the other devices 51-1 through 51-N (e.g., access devices in the same neighborhood, in the same building, or otherwise in the same slightly larger geospatial region). This pattern may continue for larger sets of access devices.

In some embodiments, and as previously indicated in connection with FIGS. 1A-1M, hub 52 may be a CMTS or other type of termination system, network 50 may be an HFC access network, and access devices 51-1 through 51-N may be cable modems or other devices (e.g., a set top terminal) communicating via the HFC access network. In other embodiments, network 50 may be a digital subscriber line (DSL) network, hub 52 may be a DSL access module (DSLAM), and access devices 51-1 through 51-N may be DSL modems or other devices communicating via the DSL network. In still other embodiments, network 50 may be a satellite of other wireless network employing adaptive equalization, access devices 51-1 through 51-N may be transceivers through which users can access the wireless network, and hub 52 may be a base station or other wireless network hub. In yet other embodiments network 50 may be a Fiber to the Home (FTTH) or Fiber to the Premises (FTTP) passive optical network (PON).

Hub 52 may communicate over one or more links 54 (e.g., a Gigabit Ethernet link) with the Internet, a private IP (internet protocol) data network, and/or other network so as to allow communications between devices 51-1 through 51-N (via hub 52) and one or more external networks. In the examples of FIG. 2 and subsequent figures, "N" represents an arbitrary number. Network 50 may include hundreds, thousands or more access devices. Hub 52 may also utilize links 54 for communication with billing servers, network management servers, and/or other network elements. One such network element is analyzer 53. Analyzer 53 retrieves data from hub 53 regarding the signal characteristics in communication paths between devices 51-1 through 51-N and hub 52. In some embodiments, this data includes pre-equalizer tap coefficients from devices 51-1 through 51-N. Analyzer 53 then processes the retrieved data to create signatures associated with devices 51-1 through 51-N, to identify devices that share communication paths or portions of paths, to diagnose and locate network problems, to identify unauthorized and/or unprovisioned devices, and/or perform other operations described herein. Although FIG. 2 shows analyzer 53 communicating with hub 52 over link 54, analyzer 53 could alternatively be connected to (or a part of) hub 52, or alternatively be connected to access network 50 itself.

Figure 3:
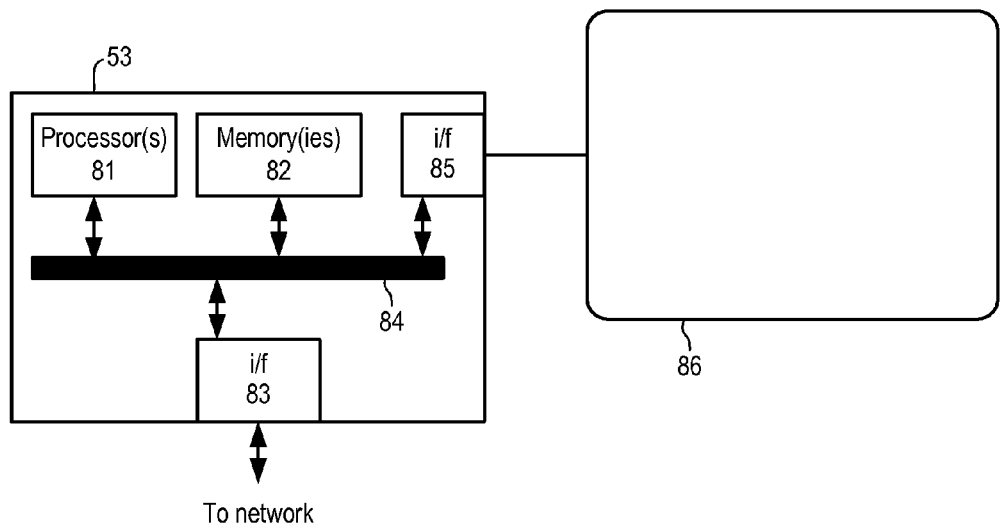
FIG. 3 is a block diagram showing an exemplary analyzer according to some embodiments.

FIG. 3 is a block diagram of an exemplary analyzer 53 according to some embodiments. In at least some embodiments, analyzer 53 can be implemented as (or as part of) a general purpose computer. Such a general purpose computer could be dedicated to performing analyzer 53 operations described herein, or could also perform other operations. Analyzer 53 communicates with hub 52 and/or other network elements over one or more network interfaces (i/f) 83. Interface 83 could be, e.g., a Gigabit Ethernet card. Analyzer 53 further includes memory 82 for storing instructions and data and a processor 81 for executing instructions and controlling operations of analyzer 53. Although a single block is shown for memory 82 and a single block shown for processor 81, memory and computational operations of analyzer 53 could respectively be distributed across multiple memory devices and multiple processors located within analyzer 53 or spread across multiple platforms (e.g., multiple general purpose computers). Memory 82 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 81 may be implemented with any of numerous types of devices, including but not limited to general purpose microprocessors, application specific integrated circuits, field programmable gate arrays, and combinations thereof In at least some embodiments, processor 81 carries out operations of analyzer 53 described herein according to machine readable instructions stored in memory 82 and/or stored as hardwired logic gates within processor 81. Processor 81 communicates with and controls memory 82 and interface 83 over one or more buses 84.

Analyzer 53 can output data to a user on a display 86 using video interface 85. Although not shown, analyzer 53 may also receive user input via a keyboard, mouse or other input device. In some embodiments, analyzer 53 may communicate with other computers over network interface 83. For example, a user having a laptop computer or other computing device could establish a communication session with analyzer 53 over one or more network links. The user could provide instructions, submit queries or otherwise interact with analyzer 53 by sending communications over the network links. Analyzer 53 could then provide data outputs to the user's computer over those same links, which data could then be output on a display of the user's computer.

Figure 4:
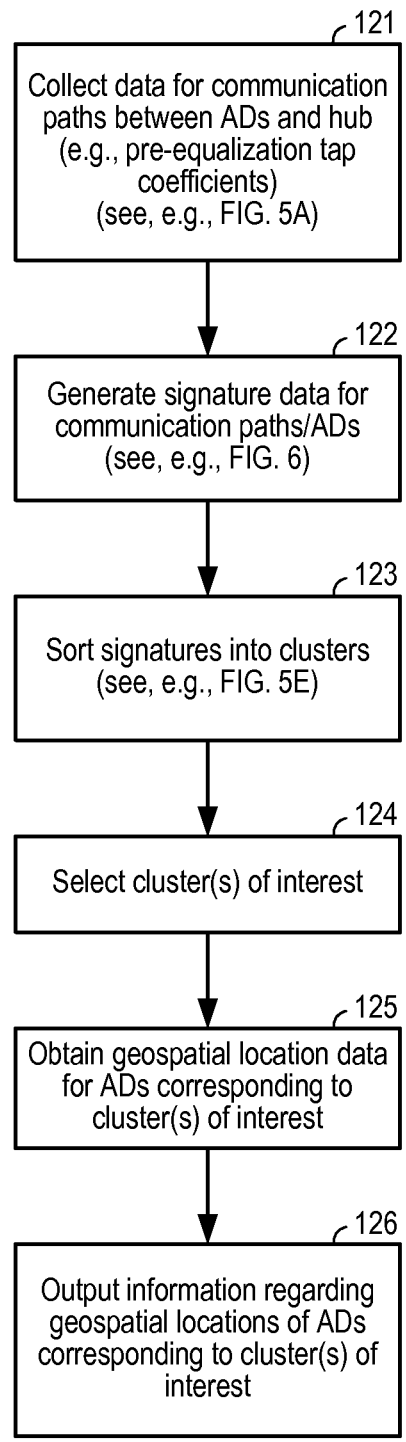
FIG. 4 is a flow chart showing operations performed by an analyzer according to at least some embodiments.

FIG. 4 is a flow chart showing operations performed by analyzer 53 according to at least some embodiments. Beginning in block 121, analyzer 53 obtains data that characterizes the communication paths between each of access devices 51-1 through 51-N and hub 52. In at least some embodiments, this data includes the pre-equalizer tap coefficients from each of devices 51-1 through 51-N. As is known in the art, many communication systems employ pre-equalization to reduce or eliminate the effects of linear distortions caused by anomalies in a network. In the context of a pre-equalizer, each "tap" may correspond to a version of a received signal that can delayed by a predetermined amount and which is amplified (or attenuated) in accordance with a set of complex coefficients (known as tap coefficients). For example, a first tap may represent a version of the received signal with 0 delay that is modified in accordance with a first set of tap coefficients, a second tap may represent a version of the received signal having t delay that is modified in accordance with a second set of tap coefficients, etc. The outputs of the taps are typically summed to create a pre-equalized signal that is then transmitted across the network. In many cases, the tap coefficients can be adjusted on an adaptive basis so as to compensate for changes in network conditions. The number of taps, the temporal delay between taps, the manner of determining tap coefficients, and other parameters can vary among (and sometimes within) different equalization schemes.

In some embodiments, hub 52 includes a database storing the tap coefficients currently being used by each of access devices 51-1 through 51-N. Analyzer 53 obtains these tap coefficients using, e.g., one or more SNMP (simple network management protocol) queries directed to hub 52. In embodiments in which access network 50 is operated in accordance with a specification or standard, such as one or more Data-Over-Cable Service Interface Specification (DOCSIS) standards, for example, a CMTS or other termination system monitors communications from cable modems. Based on quality of the received signals, the termination system individually determines (and provides) the tap coefficients to be used by each modem for upstream communications. The termination system can thus maintain a record of the tap coefficients each modem is currently using. In other embodiments, analyzer 53 may obtain pre-equalization tap coefficients from a network element other than hub 52, and/or may obtain those coefficients directly from access devices.

Figure 5E:
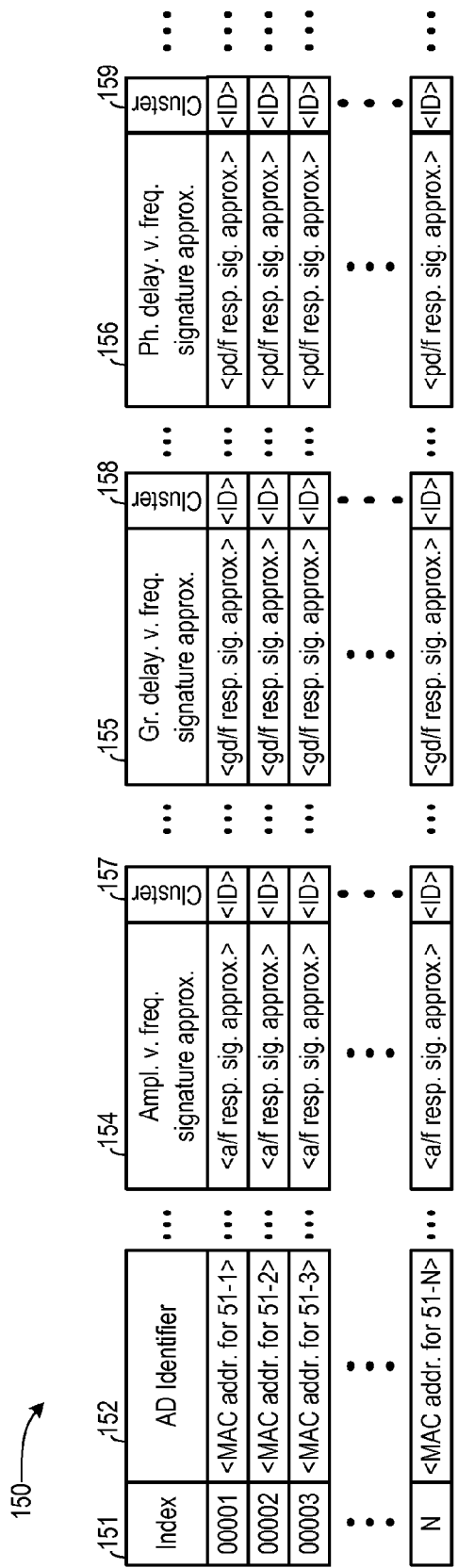

FIG. 5A shows a portion of a database 150 generated by analyzer 53 and stored in memory 82 during the operations of block 121 in FIG. 4. For convenience, FIGS. 5A-5E show data in a simple table. The table of FIGS. 5A-5E is merely one example of how data can be arranged in accordance with some embodiments. The actual format of data and/or of the tables or other data structures used to organize that data will vary among different embodiments. Each row in table 150 corresponds to a specific one of access devices 51-1 through 51-N. The cells of each row contain data related to the corresponding access device and to the communication path used by the corresponding access device to communicate with hub 52. Cells in a first column 151 contain index numbers for table 150 rows. In the present example, row 00001 corresponds to device 51-1, row 00002 corresponds to device 51-2, etc. Fields in column 152 contain identifying data for an access device on a particular row. In some embodiments, this identifying data is a media access control (MAC) address of the access device. For each of columns 153-1 through 153-P, a cell on a particular row contains a set of tap coefficients for one of the pre-equalizer taps of the access device corresponding to that row. "P" represents an arbitrary number and will depend on the type of pre-equalization scheme being used. In some DOCSIS-compliant systems, for example, P equals 24. Each set of tap coefficients has a real ("r") and imaginary ("i") component, with those components represented generically as "<r>" and "<i>". Although not shown in FIG. 5A, each of columns 153-1 through 153-P may include a row on each field that can hold a value to indicate whether a particular tap is the "main" tap (i.e., the tap corresponding to a zero time delay). At the end of step 121 (FIG. 4), each row of table 150 contains an identifier and up to P sets of tap coefficients for one of access devices 51-1 through 51-N.

Figure 6:
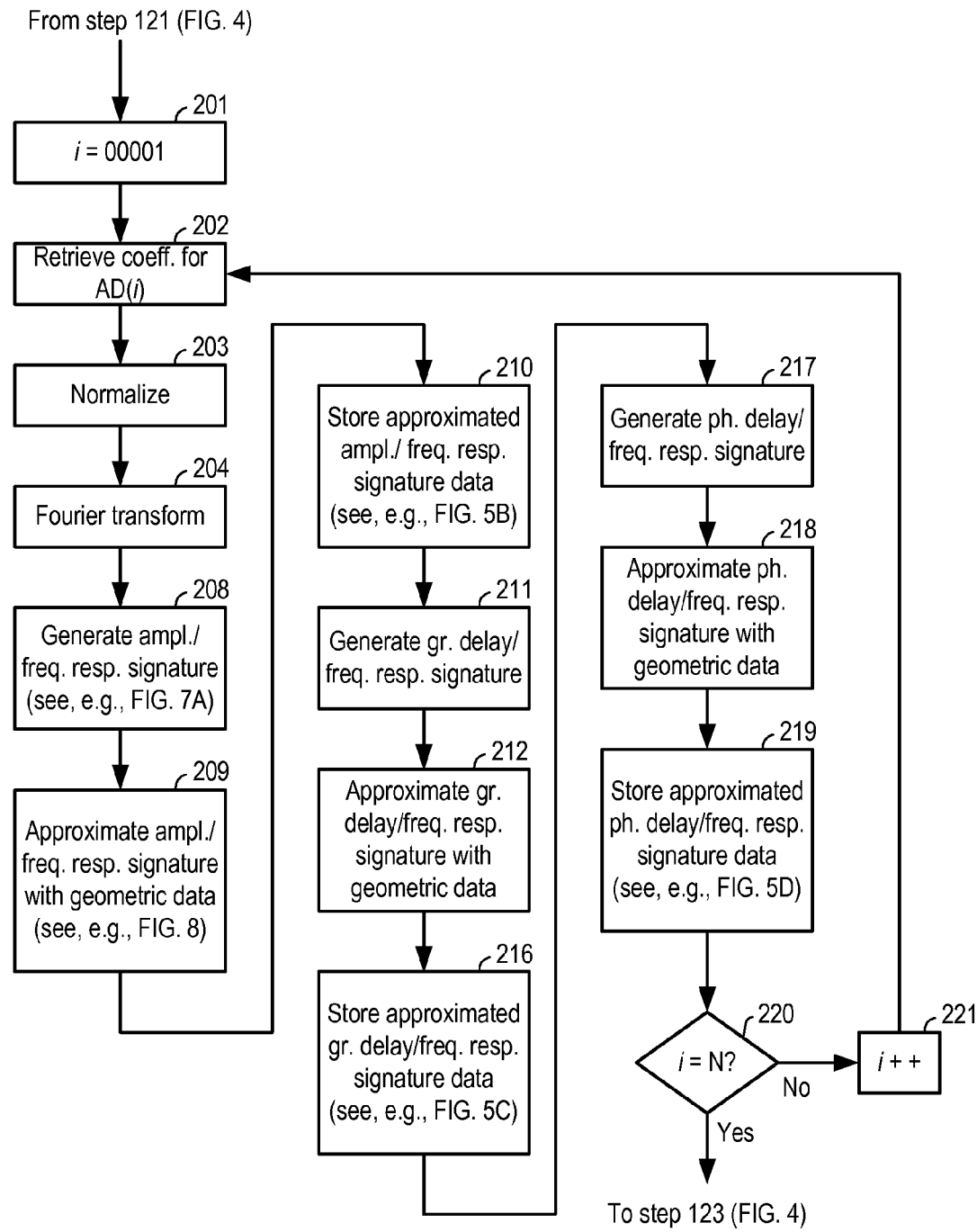
FIG. 6 is a flow chart showing additional details of operations in the flow chart of FIG. 4.

Analyzer 53 then proceeds to block 122 and generates signature data for each of access devices 51-1 through 51-N. Further details of the operations of block 122 are shown in FIG. 6. During each of multiple loops through the subroutine of FIG. 6, analyzer 53 retrieves data for one of access devices 51-1 through 51-N, generates frequency response signatures for that access device, and approximates each signature using geometric shapes. Each of these operations is described more fully below. An incremental counter "i" controls iterations of the FIG. 6 loop. For convenience, the access device for which analyzer 53 is retrieving data, generating signatures, and approximating signatures during a particular loop iteration is called the $i^{th}$ device.

In block 201, analyzer 53 sets counter i equal to a value corresponding to the first row index (00001) of table 150, thereby making the access device corresponding to that row the $i^{th}$ device. Analyzer 53 then proceeds to block 202 and retrieves the tap coefficients for the $i^{th}$ device from database 150. Analyzer 52 then proceeds to block 203 and normalizes those retrieved tap coefficients. As indicated above, the number of taps, the temporal delay between taps, the manner of determining tap coefficients, and other parameters can vary among (and sometimes within) different equalization schemes. All access devices in network 50 may not use the same pre-equalization scheme. Moreover, devices using the same scheme may implement that scheme in different ways. Although not shown in FIG. 5A, information regarding the pre-equalization scheme used by each access device and the manner of implementation can also be obtained as part of step 121 (FIG. 4). Using information regarding the pre-equalization scheme and scheme implementation for the $i^{th}$ device, the tap coefficients for that device can be adjusted (or normalized) so as to be meaningful when compared to the normalized coefficients for other access devices in network 50. In some embodiments, normalization is used to accommodate different number, format and reporting schemes in a consistent manner. In one type of network, an example of tap coefficient normalization can be found in the document titled "DOCSIS® Best Practices and Guidelines Proactive Network Maintenance Using Preequalization CM-GL-PNMP-V01-100415" (Apr. 15, 2010) available from Cable Television Laboratories, Inc.

Analyzer 53 then continues to block 204 and performs a Fourier transform on the normalized $i^{th}$ device tap coefficients. In some embodiments, analyzer 53 performs a Fast Fourier Transform (FFT) (e.g., a 100 point FFT), although other types of transforms can also be used. The Fourier transform of block 204 generates a frequency domain representation of the inverse of the amplitude/frequency response for a communication path the between the $i^{th}$ device and hub 52. In some embodiments, analyzer 53 utilizes this inverse amplitude/frequency response as the amplitude/frequency response signature. In other embodiments, analyzer 53 generates an amplitude/frequency response signature for the $i^{th}$ device in block 208 by inverting the inverse amplitude/frequency response.

Figure 7A:
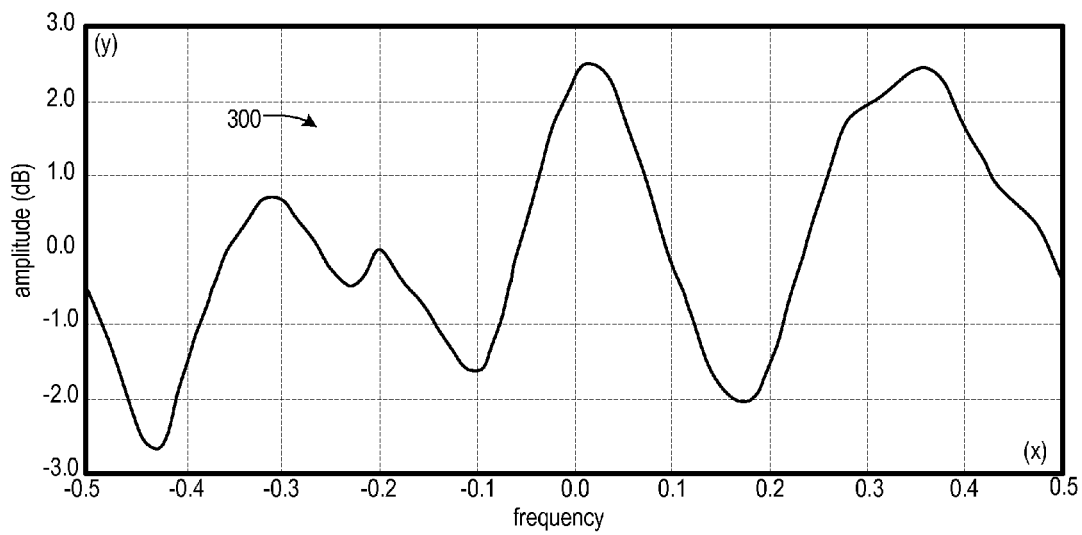
FIGS. 7A-7E graphically illustrate operations that may be performed in connection with the flows shown in FIGS. 6 and 8.

An example of an amplitude/frequency response signature 300 is shown in FIG. 7A. The shape of signature 300 is chosen for purposes of explanation. The contours of a signature generated in block 208 in any given loop iteration will depend upon the coefficients obtained during that loop iteration. For purposes of explanation, FIG. 7A graphically shows signature 300 as a waveform similar to waveforms in FIG. 1A. In practice, however, analyzer 53 may not create a graphical rendering of a signature as part of the FIG. 6 subroutine or in connection with various other operations described herein. Instead, analyzer 53 may simply store a signature as an array of (x, y) coordinates for multiple points of the signature and perform various analyses by numerically manipulating those (x, y) coordinates. Of course, analyzer 53 may render signatures graphically in some embodiments and/or under certain circumstances. In some cases, for example, a network engineer may wish to see actual signatures so to look for various patterns indicative of specific types of plant anomalies.

Figure 1E:
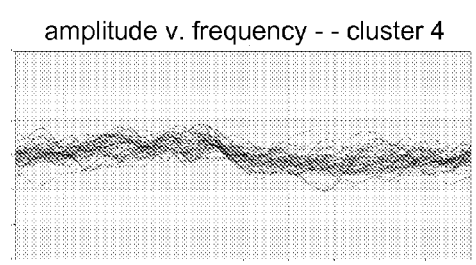
Figure 1F:
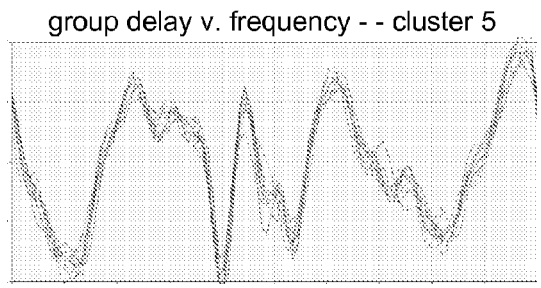
Figure 1G:
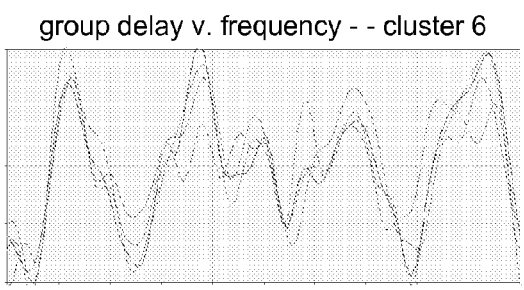
Figure 1H:
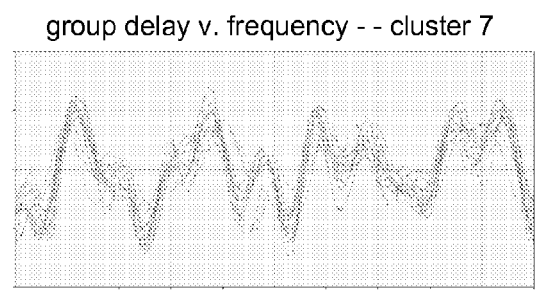
Figure 1I:
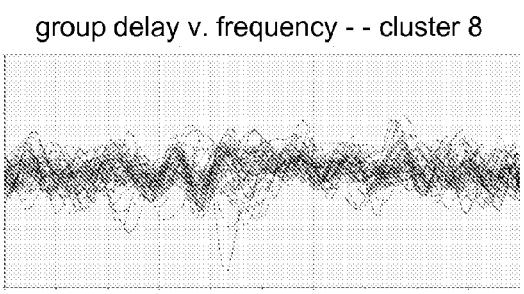
Figure 1J:
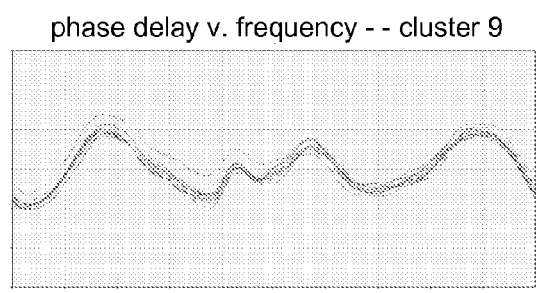
Figure 1K:
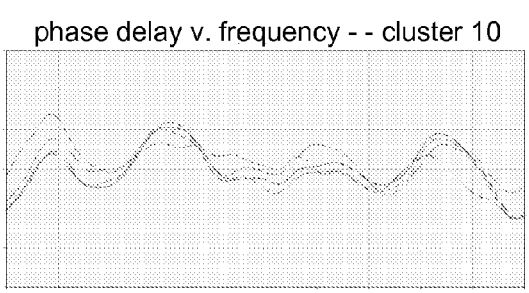
Figure 1L:
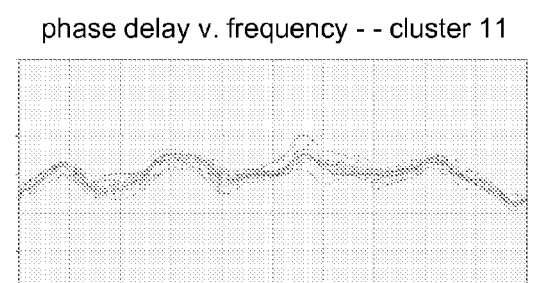
Figure 1M:
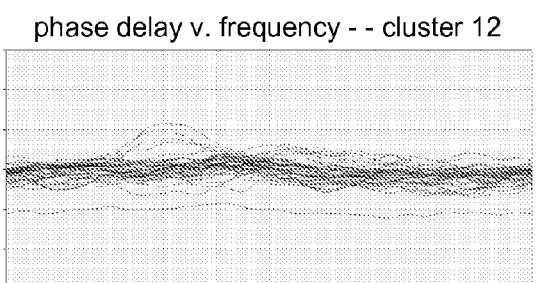
Figure 8:
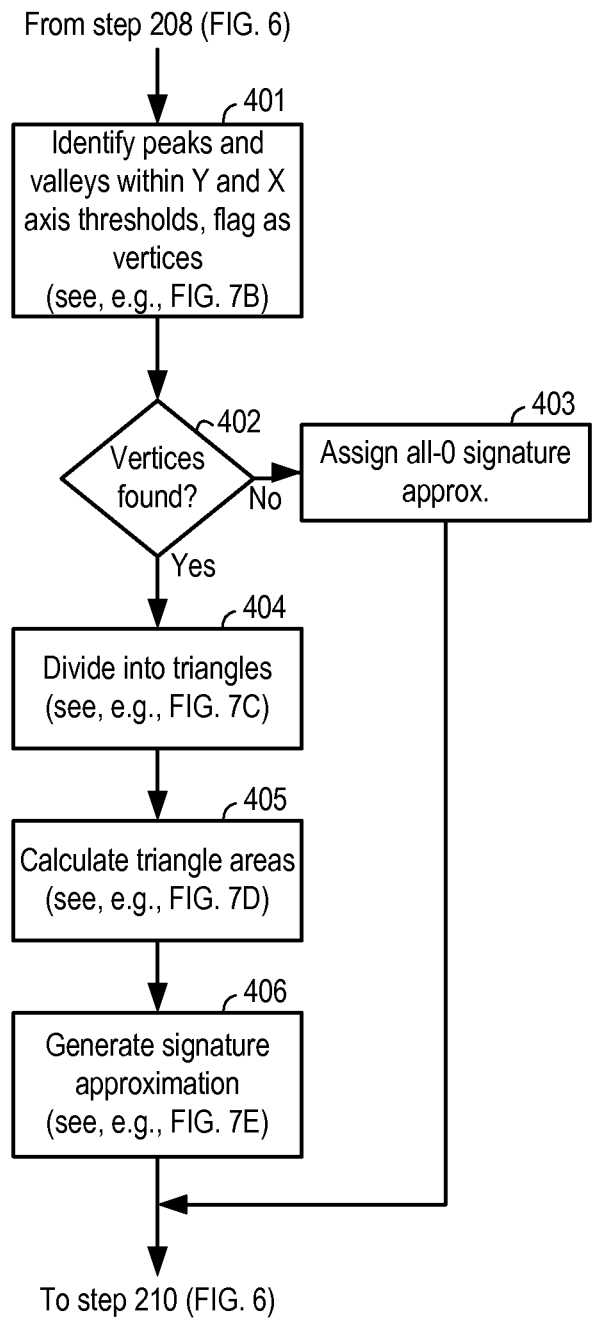
FIG. 8 is a flow chart showing additional details of operations in connection with the flow chart of FIG. 6.

After generating the amplitude/frequency response signature in block 208, analyzer 53 proceeds to block 209 and approximates that signature using simpler geometric shapes. FIG. 8 is a flowchart for a subroutine performing operations associated with block 209 of FIG. 6. In block 401, analyzer 53 traverses the array of graph points for a signature and identifies peaks and troughs of sufficiently large ripples in a signature. As seen in FIG. 1E, small ripples may be typical for communication paths in which there are no significant impairments. Relatively small y axis distances between adjacent peaks and troughs in such small ripples may indicate very minor amplitude fluctuations, and relatively small x axis distances between adjacent peaks and troughs may indicate amplitude fluctuations over a very narrow frequency range. In some circumstances, it may be useful to eliminate signatures that only have small ripples below certain thresholds. For example, a large portion of network 50 may be operating within normal parameters, and the network operator may be attempting to find problem areas.

As part of block 401, analyzer 53 identifies vector sign changes separated by minimum x axis and y axis threshold distances. In particular, a rising portion of a ripple represents increasing amplitude and a positive amplitude/frequency vector; a line tangent to a point on a rising portion of a ripple will have a positive slope. A falling portion of a ripple represents a decreasing amplitude and a negative amplitude/frequency vector; lines tangent to points on a falling ripple portion having negative slopes. A ripple peak represents a change from a positive amplitude/frequency vector to a negative amplitude/frequency vector. A ripple trough represents a change from a negative amplitude/frequency vector to a positive amplitude/frequency vector.

Figure 7B:
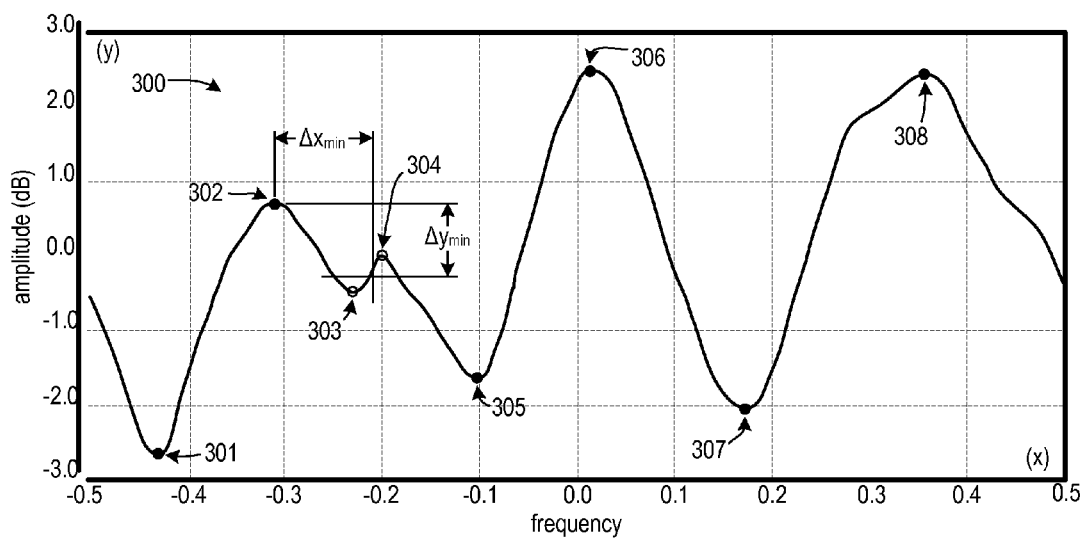

FIG. 7B illustrates identification of vector sign changes in block 401 according to some embodiments. Other techniques can be used. Analyzer 53 begins at x=0 and examines the y coordinate values of each successive point on signature 300 until it detects a vector sign change. In the present example, analyzer 53 detects the first vector sign change at point 301 of signature 300. Analyzer 53 then flags point 301 as a triangle vertex. As will become clearer below, analyzer 53 will ultimately approximate signature 300 with a series of adjacent triangles. Analyzer continues examining the y coordinate values of successive points on signature until the next vector sign change is found. In the current example, the next vector sign change occurs at point 302.

For each vector sign change found after the first vector sign change (all vector sign changes found after point 301 in the current example), analyzer 53 determines if that vector sign change is separated by a minimum x axis distance ($\Delta x_{min}$) and by a minimum y axis distance ($\Delta_{min}$) from the previously flagged vertex (point 301 in the current example). Values for $\Delta x_{min}$ and $\Delta y_{min}$ can be established based on experience with a particular network and knowledge of typical problems that have historically occurred. In some networks, for example, amplitude/frequency responses having ripple magnitudes in excess of 5 dB may occur in 90% of cases that involve in-premises or tap-related problems. As another example, amplitude/frequency responses having eight or more ripples with magnitudes in less than 5 dB may occur in 75% of cases that involve reflection from an amplifier. As a further example, amplitude/frequency responses having ripple magnitudes in less than of 1 dB may be considered within normal operating parameters.

Because the x and y separation of points 301 and 302 exceed $\Delta x_{min}$ and $\Delta y_{min}$, respectively, point 302 is flagged as the next vertex. Analyzer 53 then continues and identifies the next vector sign change at point 303. Although the y distance between points 303 and the last vertex (point 302) exceeds $\Delta y_{min}$, the x distance between points 303 and 302 is less than $\Delta x_{min}$. Accordingly, analyzer 53 ignores point 303 and does not mark it as another vertex. Analyzer 53 then continues until it identifies the next vector sign change at point 304. Upon comparing point 304 to the last flagged vertex (point 302), analyzer 53 determines that the x axis separation between points 304 and 302 exceeds $\Delta x_{min}$, but the y axis separation is less than $\Delta y_{min}$. Accordingly, point 304 is also ignored. This process continues, and additional vertices 305, 306, 307 and 308 are identified.

As can be appreciated from the foregoing, the number of vertices identified for any particular signature will vary based on the specifics of that signature and on the values used for $\Delta x_{min}$ and $\Delta y_{min}$. Moreover, other techniques can be used to identify triangle vertices on a signature. In some instances, two different techniques may provide different results for the same signature. In general, however, this does not pose a problem. The ultimate purpose of identifying vertices is approximation of signatures so as to compare those signature approximations against each other. If the same technique is used to approximate all signatures in a set of signatures, any affect on vertex location resulting from differences in vertex identification techniques will impact the approximations of all signatures in that set in the same way.

After traversing all points of a signature in block 401 and identifying vertices, analyzer 53 continues to block 402. For some signatures, analyzer 53 may find not any vertices during the operations of block 1. For example, a signature may only include small ripples that have no peaks or valleys separated by both $\Delta x_{min}$ and $\Delta y_{min}$. Accordingly, analyzer 53 determines in block 402 if the operations of block 401 failed to identify vertices. If no vertices were identified, analyzer 53 proceeds on the "no" branch to block 403 and assigns an all-0 approximated signature value. The format of approximated signature values is discussed below. Analyzer 53 would then continue from block 403 to block 210 of FIG. 6. Block 210 of FIG. 6 is discussed below. If in block 402 analyzer 53 determines that vertices were identified in block 401, analyzer 53 continues to block 404 on the "yes" branch.

Figure 7C:
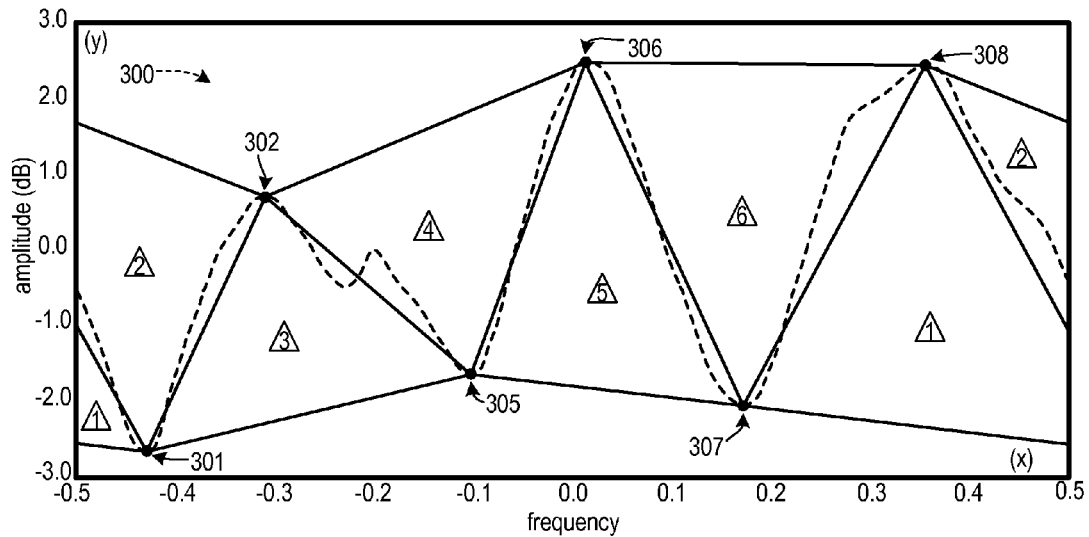

In block 404, analyzer 53 divides the signature into adjacent triangles using the vertices identified in block 401. This is illustrated in FIG. 7C. To avoid confusion, signature 300 is shown in broken line in FIG. 7C and the grid lines of the graph are omitted. Because a signature results from a Fourier transform and is thus circular, the far left side of the signature is a continuation of the far right side, and vice versa. Accordingly, at least one of the triangles will span the edges of the graph used to show signature 300. For example, triangle 1 (formed by vertices 301, 307 and 308) has a first portion at the far left of FIG. 7C and a second portion at the far right of FIG. 7C. Triangle 2 (formed by vertices 301, 302 and 308) also has portions on the left and right sides of the graph. The remaining four triangles, which do not span the graph edges, are triangles 3 (vertices 305, 302 and 301), 4 (vertices 305, 306 and 302), 5 (vertices 307, 306 and 305) and 6 (vertices 307, 308 and 306).

Figure 7D:
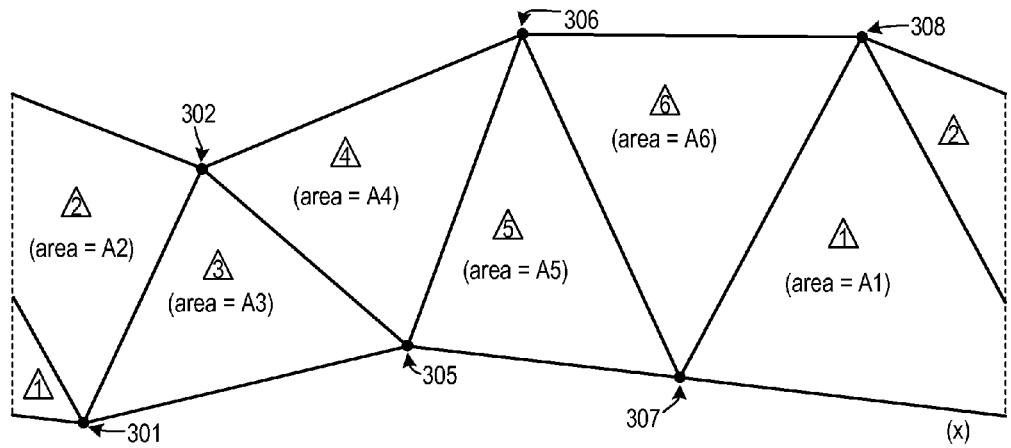
Figure 7E:
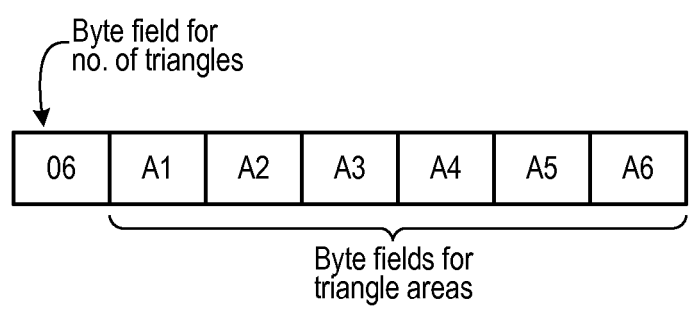

Analyzer 53 then continues to block 405 and calculates areas for each of the triangles from block 404. This is illustrated in FIG. 7D, which shows triangles 1-6 removed from the graph of FIGS. 7A-7C. For convenience the area of triangle 1 is shown as "A1," the area or triangle 2 shown as "A2," etc. After calculating triangle areas, analyzer 53 continues to block 406 and generates an approximated signature value for the signature based on the number of triangles and the triangle areas. In some embodiments, the approximated signature value has a multibyte format in which the first byte specifies the number of triangles, and in which each successive byte contains the area for one of the triangles. Accordingly, the approximated signature value for signature 300 according to the current example would be as shown in FIG. 7E. Triangle area byte value fields could be populated according to any desired convention. For example, and as shown in FIG. 7E, some embodiments populate the first area value byte field with the area of the triangle having a portion at the bottom of the far left. Subsequent fields are then populated by traversing adjacent triangles across shared sides until all triangle areas have been added to the signature approximation. Although the example approximated signature of FIG. 7E is seven bytes in length in the present example, the byte length for signature approximations will vary based on the number vertices (and thus the number of triangles) found when approximating a signature. From block 406 of FIG. 8, analyzer 53 proceeds to block 210 of FIG. 6. In block 210, and as shown in FIG. 5B, analyzer 53 stores the amplitude/frequency response signature approximation for the $i^{th}$ device in database 150. The values "A1," "A2," etc. in FIGS. 5E and 7E are only meant to generically represent the values of triangle areas and are not necessarily intended as hexadecimal representations of actual areas.

Analyzer 53 then continues to block 211 and generates a group delay/frequency response signature for the $i^{th}$ device using the Fourier transform previously performed for the $i^{th}$ device at block 204. Generation of a group delay/frequency response signature from a frequency domain representation of a channel response (or of an inverse channel response) is a technique known to persons of ordinary skill and thus not described herein. As with the amplitude/frequency response signature discussed above, analyzer 53 may use an inverse group delay/frequency response as the group delay/frequency response signature, or may generate a group delay/frequency response signature by inverting an inverse group delay/frequency response.

As explained above in connection with FIGS. 1A-1I, the ripples in a group delay/frequency response signature may differ from those of an amplitude/frequency response signature. Thus, analyzer 53 continues to block 212 and repeats the approximation operations previously performed in block 209, but instead using the group delay/frequency response signature generated for the $i^{th}$ device in block 211. When performing the approximation in block 212, however, analyzer 53 may utilize values for Ax. and/or $Ay_{min}$ that are different from the values used when performing approximation operations in block 209. The output of block 212 is a group delay/frequency response signature approximation that has the same format as that shown in FIG. 7E. However, a group delay/frequency response signature approximation for the $i^{th}$ device may be based on more or fewer triangles than were utilized in creating the amplitude/frequency response signature approximation for the $i^{th}$ device, and those triangles may have different areas. The output of block 212 could also be an all-0 value if the group delay/frequency response signature had ripples below the applicable $\Delta x_{min}$ and/or $\Delta y_{min}$ values. In block 216, and as shown in FIG. 5C, the $i^{th}$ device group delay/frequency response signature approximation is stored in database 150 (shown generically as "<gd/f resp. sig. approx.").

Analyzer 53 then continues to block 217 and generates a phase delay/frequency response signature for the $i^{th}$ device using the Fourier transform previously performed for the $i^{th}$ device at block 204. Generation of a phase delay/frequency response signature from a frequency domain representation of a channel response (or of an inverse channel response) is also a common technique known to persons of ordinary skill. As with the amplitude/frequency response signature discussed above, analyzer 53 may use an inverse phase delay/frequency response as the phase delay/frequency response signature, or may generate a phase delay/frequency response signature by inverting an inverse phase delay/frequency response.

Because a phase delay/frequency response signature may also be different from the signatures generated in blocks 208 and 211, analyzer 53 continues to block 218 and repeats the approximation operations previously performed in blocks 209 and 212, but now using the phase delay/frequency response signature generated for the $i^{th}$ device in block 217. Analyzer 53 may utilize values for $\Delta x_{min}$ and/or $\Delta y_{min}$ that are different from the values used when performing approximation operations in block 209 or in block 212. The output of block 218 is a phase delay/frequency response signature approximation that has the same format as that shown in FIG. 7E, but which may have data based on a different number of triangles (and/or triangles of different shapes) than were used in blocks 209 or 212. The output of block 218 could also be an all-0 value if the phase delay/frequency response signature had ripples below the applicable $\Delta x_{min}$ and/or $\Delta y_{min}$ values. In block 219, and as shown in FIG. 5D, the $i^{th}$ device phase delay/frequency response signature approximation is stored in database 150 (shown generically as "<pd/f resp. sig. approx.").

Analyzer then continues from block 219 to block 220 and determines if there are additional devices in database 150 for which the operations of blocks 201 through 219 should be performed. If so (i.e., if i<N), analyzer 53 proceeds on the "no" branch to block 221 and increments counter i. Analyzer 53 then returns from block 221 to block 202 and repeats the operations of block 202 through block 219 for the next access device. If in block 220 analyzer 53 determines that there are no more access devices for which the operations of block 202 through block 219 should be performed, analyzer proceeds on the "yes" branch from block 220 to block 123 of FIG. 4.

In block 123, analyzer 53 then utilizes the signature approximations to sort signatures into clusters based on similarities between signatures. Specifically, analyzer 53 first sorts all of the amplitude/frequency response signature approximations, then sorts all of the group delay/frequency response signature approximations, and then sorts all of the phase delay/frequency response signature approximations. As a result of this sorting, various clusters of signatures similar to those indicated in FIGS. 1B-1M can be identified.

Various methods can be used to compare signature approximations when performing sorting operations. In some embodiments, only the first byte (number of triangles) is used. Thus, one cluster might identify signatures for which approximations had no triangles, another cluster might identify signatures for which approximations had two triangles, etc. In still other embodiments, both the number of triangles and the sizes of triangles are compared. For example, two signature approximations might be sorted into the same cluster if each has the same value in the first byte (i.e., same number of triangles) and if area bytes for a similar triangle position are within a designated percentage of one another (e.g., if the second byte value in one of those signature approximations is within 10% of the second byte value in the other of those signature approximations, etc.). Still other sorting methods can be used.

At the conclusion of block 123, signatures of each type are assigned to different clusters. As shown in FIG. 5E by columns 157-159, these cluster assignments can be stored in fields of database 150 as numbers or other identifiers used to identify various clusters. For example, all devices associated with a cluster of amplitude/frequency response signatures would have a specific value identifying that cluster in a field of column 157 on the row corresponding to that device.

In block 124, analyzer 53 selects one or more clusters that may be of interest. In some cases, a user of analyzer 53 provides (or may have previously provided) input that identifies a specific access device. Based on identification of that specific access device, analyzer 53 may then identify all other access devices that are associated with a signature in the same cluster as a signature for the identified devices. A network operator may identify a specific access device for any of various reasons, one example of which is further discussed below. As another example, a user of analyzer 53 may provide (or may have previously provided) input requesting identification of signatures having certain specific characteristics. Based on the specified characteristics, analyzer 53 may then identify signatures having those characteristics and identify access devices associated with those signatures. An example of signature identification in this manner is also described below.

In block 125, analyzer 53 obtains geospatial location data for each access device in the selected cluster(s) from block 124. In some embodiments, analyzer 53 may obtain this data from a separate database that maintains information about each access device authorized to operate in network 50. This separate database could be, e.g., an account database having addresses for premises at which authorized access devices are deployed.

Figure 9A:
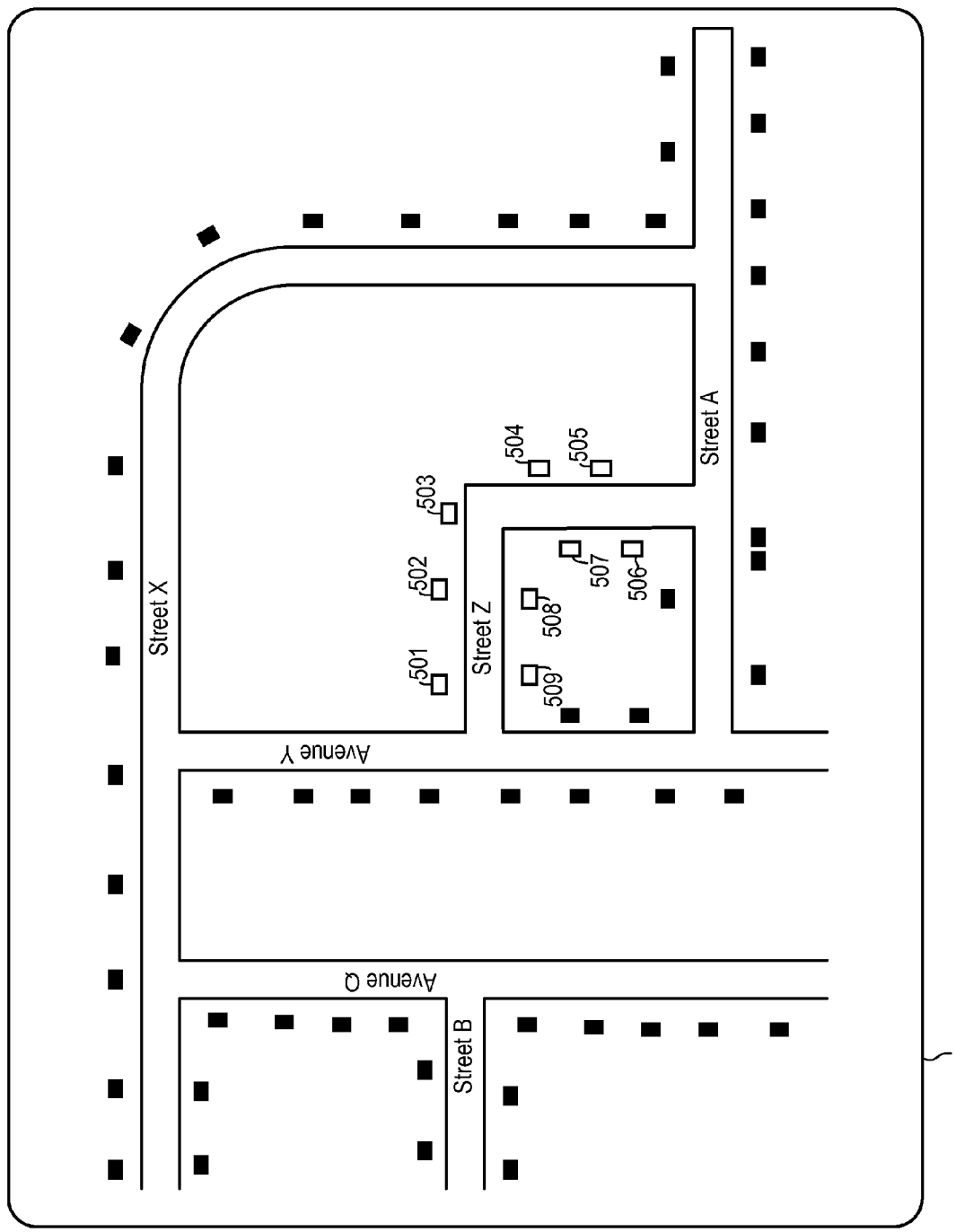
FIGS. 9A-9C show exemplary analyzer output displays according to some embodiments.

In block 126, analyzer 53 outputs information to a user regarding locations of access devices in the cluster(s) of interest. In some embodiments, and as shown in FIG. 9A, analyzer 53 outputs this information on display 86 (FIG. 3) in the form of a map showing access device locations. In the example of FIG. 9A, devices in the cluster of interest are identified with highlighted icons 501-509. Devices not in the cluster of interest can be shown with unhighlighted icons (black rectangles in FIG. 9A). In some embodiments, additional information regarding devices in the cluster of interest can be displayed automatically or in response to additional user input (e.g., such as hovering a cursor over one of icons 501-509). Such information could include MAC address for a device, a device IP address, the name of a customer or other person associated with a device in a billing or other database, current performance data for a device, etc.

In many large networks, persons sometimes obtain service without permission from the network operator. For example, an unscrupulous person may move into a house, apartment, office or other premises that is within the service area of network 50. That premises may already be equipped with a physical connection to network 50 (e.g., in connection with a previous occupant). However, the unscrupulous person may not have entered into an agreement with the network 50 operator to pay for service and/or to otherwise abide by appropriate network usage policies. If the unscrupulous person obtains an access device and copies provisioning information from an authorized access device, the unscrupulous person might then be able to connect his unauthorized device to network 50 and obtain service. Conventional techniques for identifying such unauthorized devices can be labor intensive and may interfere with service provided to authorized devices. In some embodiments, analyzer 53 can utilize signature data to locate access devices that are using network 50 without authorization.

Figure 10:
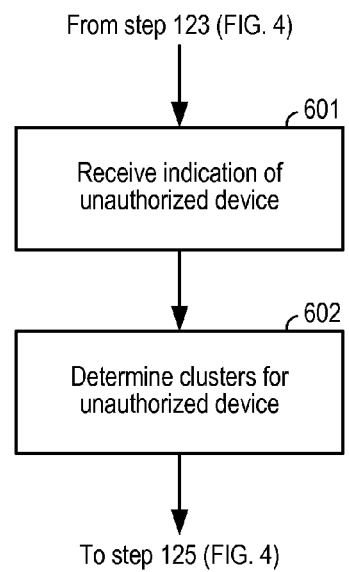
FIG. 10 is a flow chart showing additional details of operations in the flow chart of FIG. 4 according to at least some embodiments.

FIG. 10 is a block diagram showing operations of analyzer 50, according to at least some embodiments, when locating unauthorized devices. In at least some embodiments, the operations of blocks 601 and 602 are performed as part of the operations of block 124 of FIG. 4. In block 601, analyzer 53 receives an identification of an unauthorized device in network 50. This identification could be, e.g., a user input specifying a particular MAC address or other identifier. The operator of network 50 may become aware of unauthorized devices in any of various manners. In some embodiments, for example, analyzer 53 or another network element may periodically comb device identifiers in database 150 for unauthorized devices. Unauthorized devices can be identified in any of various ways. As one example, the MAC address of each device in table 150 can be compared against other databases having information about authorized devices. If a particular MAC address in table 50 cannot be found in one of those other databases, that MAC address likely represents an unauthorized device. As another example, an unscrupulous person may have copied a MAC address from the same authorized device from which the unscrupulous person obtained provisioning information for his unauthorized device. Accordingly, a determination can be made as to whether two devices in table 150 (or two devices in a larger network of which access network 50 is a part) are using the same MAC address.

In response to identification of an unauthorized device, and as shown in block 602, analyzer 53 determines clusters for the response signatures of the unauthorized device. For example, analyzer 53 may check the cluster identifier in the field of column 157 of table 150 (see FIG. 5E) on the row corresponding to the unauthorized device. Using the cluster identifier in that field, analyzer 53 then identifies other devices having amplitude/frequency response signatures in the same cluster. Analyzer 53 may then repeat these steps for the cluster identifier in column 158 so as to identify other devices having group delay/frequency response signatures in the same cluster as the unauthorized device, and for the cluster identifier in column 159 so as to identify other devices having phase delay/frequency response signatures in the same cluster as the unauthorized device.

Figure 9B:
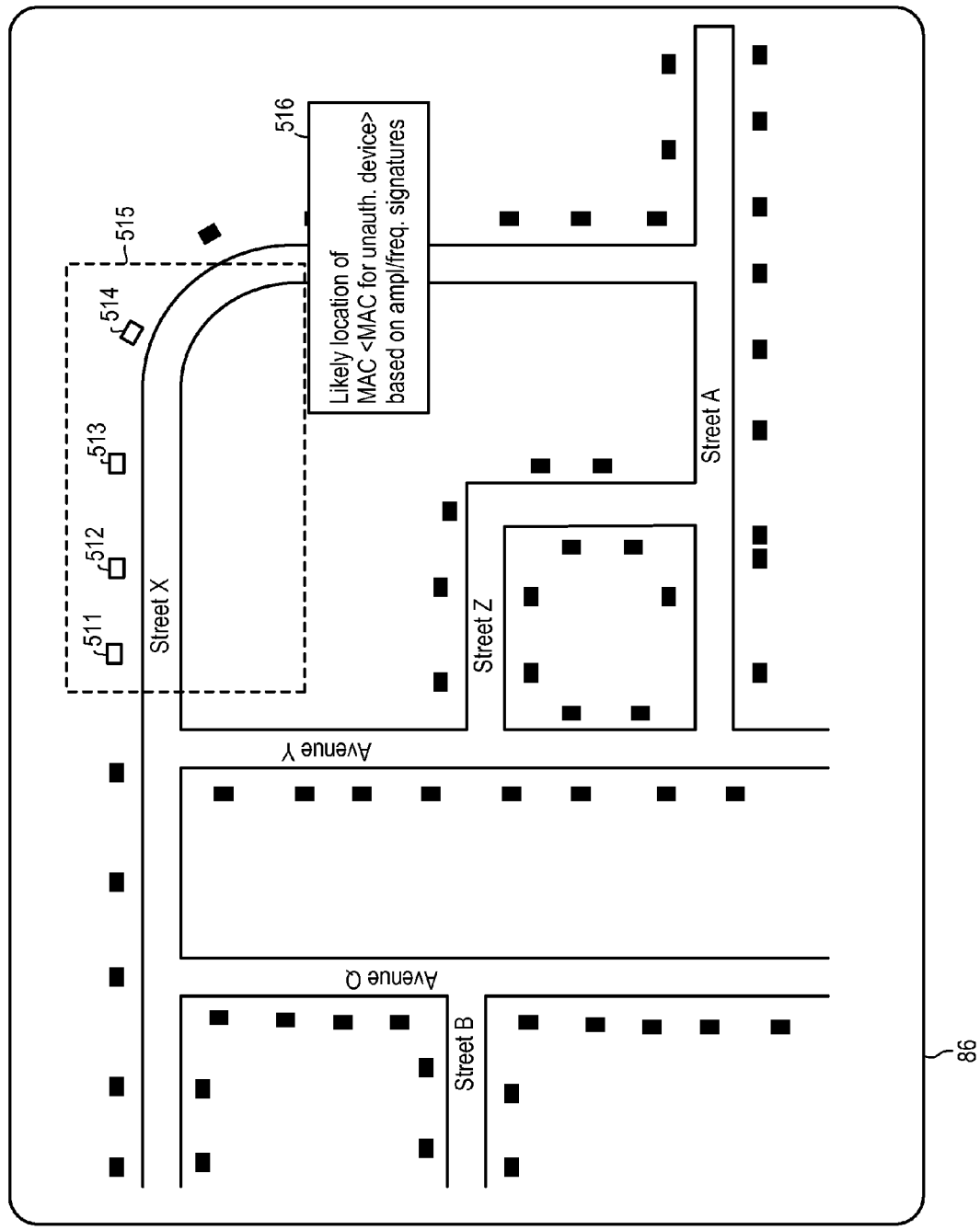

Analyzer 53 then continues from block 602 to block 125 (FIG. 4) and obtains geospatial location data for authorized devices in the one or more clusters identified in block 602. Analyzer 53 then proceeds to block 126 of FIG. 4 and outputs a display of locations for such authorized devices. An example of such a display is shown in FIG. 9B. Because the unauthorized device may not be listed in the billing or other databases of the network 50 operator, the analyzer 53 may not have geospatial location for the unauthorized device. However, analyzer 53 will likely have geospatial location data for other devices associated with signatures similar to a signature associated with the unauthorized device. In other words, analyzer 53 will likely have location information for authorized devices associated with signatures in a cluster that also includes a signature associated with the unauthorized device. Based on the locations of those authorized devices, the network operator knows that the unauthorized device is likely in the same area. In some embodiments, and as shown in FIG. 9B, analyzer 53 provides a display showing an area (box 515) in which an unauthorized device is likely located and one or more corresponding dialog displays 516. In some embodiments, analyzer 53 might only highlight the authorized devices (511-514 in the present example) associated with a signature cluster also associated with the unauthorized device.

If available, plant mapping data (e.g., locations of taps, feeder lines and/or other elements) can be used to estimate an area such as box 515 or to otherwise identify possible locations of the unauthorized device. In various other embodiments, routing of the plant mapping data (e.g., location of taps, feeder lines, trunks, etc.) of the access network may be schematically shown on map 86. If devices 511-514 all share the same tap, for example, the unauthorized device is likely located at a premises that is also connected to network 50 through that same tap. If devices 511-514 do not share a common tap but instead share some component further upstream (e.g., if they are served by different feeders from a common trunk), the unauthorized device is likely located at a premises that is also connected to network 50 via that common element. Alternatively (or in addition), an area such as box 515 can be estimated using an adjustable radius or other distance from authorized devices associated with a signature cluster also associated with the unauthorized device.

Once the network 50 operator has narrowed the geospatial region in which an unauthorized device is located, the operator can take additional steps to find the unauthorized device. For example, the operator could consult other databases or records and determine what premises in that region have been physically connected to network 50. The operator could then determine which of those connected premises should be active (e.g., which premises are covered by an appropriate agreement with an end user) and which should be inactive. The operator could then disconnect network connections at premises that should be inactive.

As indicated above, a device may be associated with one cluster of amplitude/frequency response signatures, with a different cluster of group delay/frequency response signatures, and with yet another cluster of phase delay/frequency response signatures. Each of those clusters may have different associated devices, and one (or two) of the clusters may have a much larger number of associated devices that the third cluster. In some embodiments, analyzer 53 may allow user input to selectively cause display of devices co-associated with the unauthorized device in a cluster for each type of signature. For example, a display of authorized devices co-associated with the unauthorized device's amplitude/frequency response signature may result in a small number of devices in a relatively concentrated area. However, the unauthorized device may have a normal group delay/frequency response signature in a cluster that is associated with a larger number of devices over a larger area. In some embodiments, analyzer 53 can be configured to automatically select the unauthorized device signature cluster having the fewest associated authorized devices and to display those authorized devices in that automatically selected cluster.

In some cases, an unauthorized device may not have a signature that is sufficiently unique to narrow the device location to particular region. For example, each of the amplitude/frequency, group delay/frequency and phase delay/frequency response signature may be part of a large cluster (e.g., a "normal" or "rope" cluster) having numerous signatures. This could occur, e.g., if the unauthorized device is located in an area where no plant anomalies are causing significant distortions. In some embodiments, this can be addressed by repeating operations of blocks 121-123 for all devices associated with a signature in one of those large clusters. When repeating those operations, however, the $\Delta x_{min}$ and/or $\Delta y_{min}$ values used during signature approximation (described, e.g., in connection with block 801 of FIG. 8) can be reduced so as to better discriminate among signatures.

In some embodiments, differences between different types of signatures for a specific device can also be used to locate certain types of plant anomalies. As but one illustration, signature differences can be used to locate faulty or missing end-of-line (EOL) terminators in an access network, such as an HFC access network. Many networks employ EOL terminators to reduce microreflections in the coaxial portion of the plant. As is known in the art, an EOL terminator is a physical connector having a 75Ω resistor installed on unused cable connection positions on a line tap to avoid impedance mismatch. If an EOL terminator is missing or damaged, resulting microreflections can cause signal distortion. Conventional techniques for identifying damaged or missing EOL terminators are labor intensive, time-consuming and expensive. In particular, skilled technicians are periodically dispatched to physically examine and test EOL terminators on each tap in large portions of a network. In many cases, such taps are located on telephone poles, and accessing such taps requires the use of a bucket lift truck or other specialized equipment.

Figure 11A:
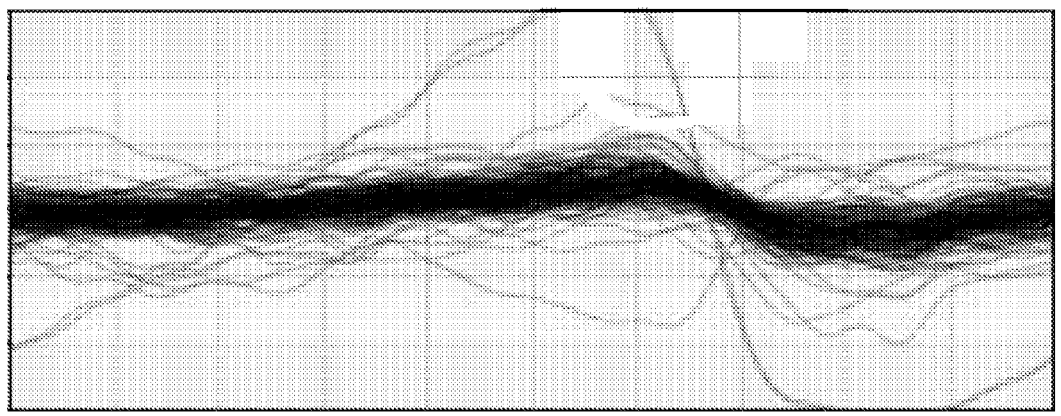
FIGS. 11A-11C are examples of frequency response signatures in a network.
Figure 11B:
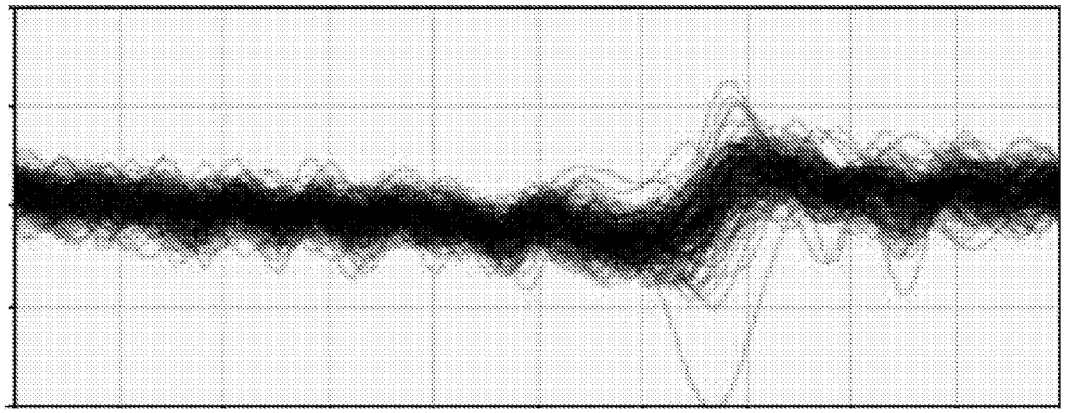
Figure 11C:
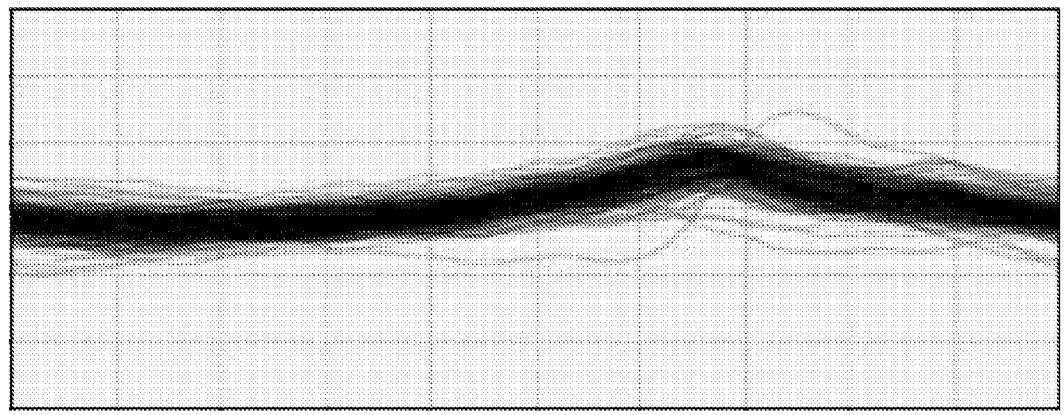

FIGS. 11A-11C are examples of frequency response signatures consistent with faulty or missing end-of-line terminators affecting a portion of devices in a network. In many cases, a faulty or missing EOL terminator will cause significant amplitude distortion. For example, FIG. 11A shows amplitude/frequency response signatures for 158 devices. A small cluster of those signatures has a large ripple indicative of amplitude distortion. Frequently, however, a faulty of missing EOL terminator will cause little of no group delay or phase delay. FIG. 11B shows group delay/frequency response signatures for the same devices associated with signatures of FIG. 11A, and generally represents no significant group delays for any of those devices. FIG. 11C shows phase delay/frequency response signatures for the same devices associated with signatures of FIG. 11A, and generally represents no significant phase delays for any of those devices. Moreover, many networks utilize taps that have directional isolation. If a cable connection position on such a tap has a faulty or missing EOL connector, any resulting distortion is limited to devices sharing that tap.

In some embodiments, analyzer 53 locates taps having faulty or missing EOL terminators by identifying devices having an amplitude/frequency response signature meeting certain characteristics indicative of amplitude distortion and also having group delay/frequency response and phase delay/frequency response signatures indicative of no significant group or phase delay. Once such devices are found, they can be located using associated geospatial data. Knowledge of tap locations in the network physical plant can then be used to determine which tap(s) likely have faulty or defective EOL terminators.

Figure 12:
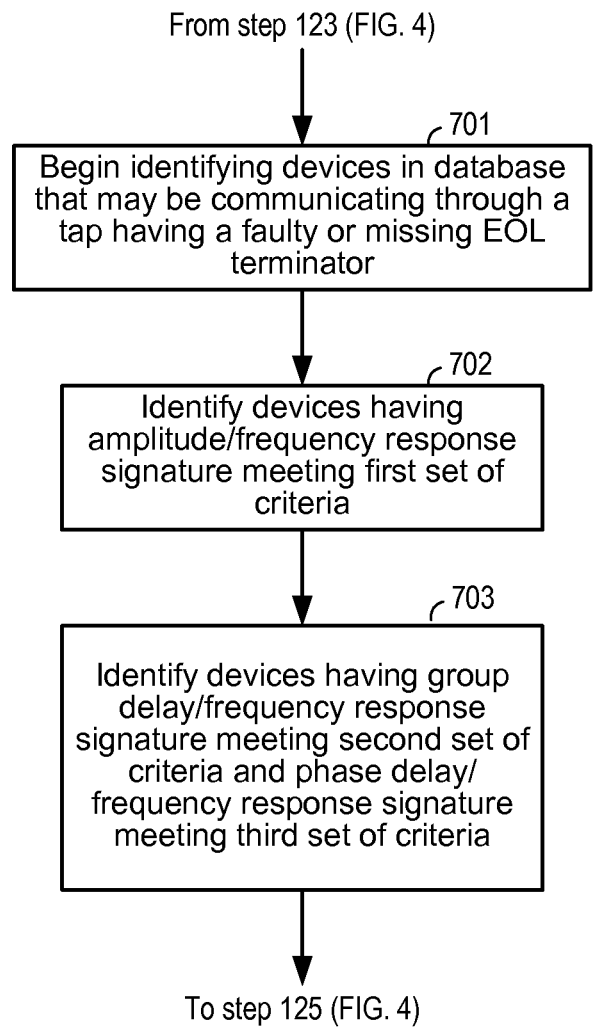
FIG. 12 is a flow chart showing additional details of operations in the flow chart of FIG. 4 according to at least some embodiments.

FIG. 12 is a flow chart showing operations performed by analyzer 53 when attempting to localize faulty or missing EOL terminators. In some embodiments, the operations of blocks 701-703 are performed as part of the operations of block 124 of FIG. 4. In block 701, in response to a received instruction, analyzer 53 begins identifying devices in database that may be communicating through a tap having a faulty or missing EOL terminator. In block 702, analyzer 53 identifies devices in database 150 associated with an amplitude/frequency response signature meeting a first set of criteria consistent with faulty or missing end-of-line terminators. For example, a set of criteria for finding problems in a single tap located at the end of a line could specify that a signature should have two detectable ripples with a peak/valley threshold of 4 dB, and that there should be at least one and no more than eight common signatures present. Analyzer 53 then proceeds to block 703 and identifies devices, from within the devices identified in block 702, associated with a group delay/frequency response signature meeting a second set of criteria and associated with a phase delay/frequency response signature meeting a third set of criteria. In at least some embodiments, the second set of criteria could specify that the group delay/frequency response signature has no ripples exceeding a certain magnitude. The third set of criteria could similarly specify that the phase delay/frequency response signature has no ripples exceeding a certain magnitude.

Figure 9C:
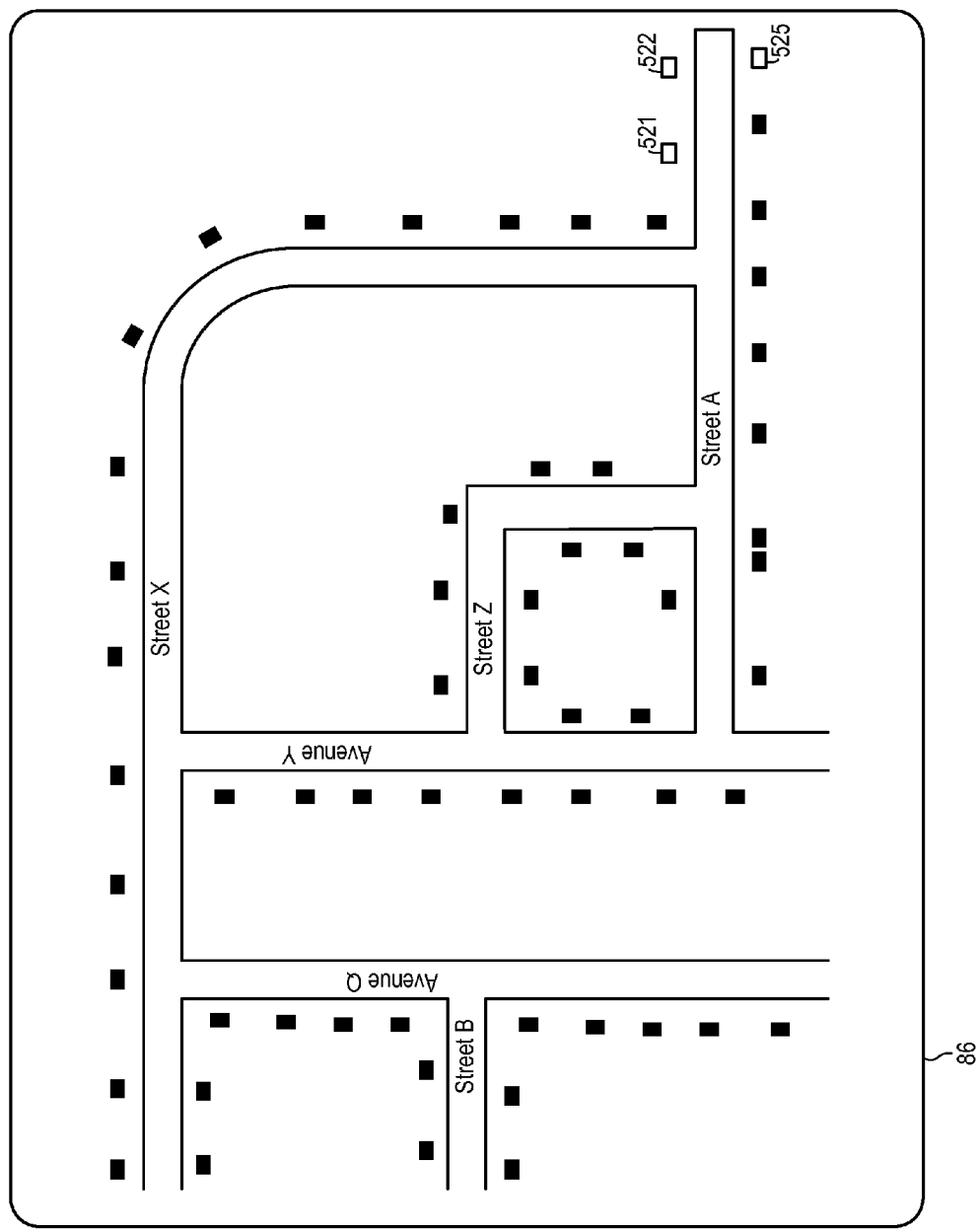

After identifying devices associated with signatures meeting the specified criteria in blocks 702 and 703, analyzer 53 proceeds to block 125 (FIG. 4) and obtains geospatial location data for the devices identified in block 703. Analyzer 53 then proceeds to block 126 of FIG. 4 and outputs a display of locations for such devices. An example of such a display is shown in FIG. 9C, where analyzer 53 has highlighted devices 520-525 at the end of Street A. Using knowledge of locations within network 50, the network 50 operator can then determine which taps in network 50 serving the devices indicated in the display of FIG. 9C. Although FIG. 9C shows one set of indicated devices for convenience, this need not be the case. In some cases, for example, analyzer 53 might identify a first set of devices in a first region, a second set of devices in a second region, etc. In some embodiments, tap locations may also maintained in a database accessible by analyzer 53. In such embodiments, locations of taps serving devices associated with signatures meeting the first, second and third sets of criteria could be displayed.

In some embodiments, the identification of devices during the operations associated with FIG. 12 can be checked by evaluating (or re-evaluating) signatures associated with devices served by a tap directly of further upstream from a tap serving the identified devices. If those devices served by the upstream tap are not associated with signatures meeting the first, second and third sets of criteria, the faulty or missing EOL terminator is likely located on the downstream tap or at some location downstream from the downstream tap.

Numerous variations on the methods and systems described above can be employed in various other embodiments. As but one example, certain operations described in connection with various flow charts can be rearranged, omitted or replaced with other operations. As just one example, in various embodiments, normalization block 203 in FIG. 6 may be performed after block 204, which performs the transform operation on the equalization coefficients. When block 204 precedes block 203, normalization may be performed on the transformed data instead of the equalization coefficients.

In other variations, various embodiments may utilize other algorithms for determining response signatures from the pre-equalization coefficients, instead or in addition to the calculated amplitude, group delay, and phase delay graphs based on the FFT in FIG. 6. Variations may include determining signatures based on other frequency domain algorithms such as cosine and wavelet transforms, time domain algorithms such as analysis based on impulse responses, and time-frequency representation algorithms such as spectrograms and scaleograms. Still other illustrative algorithms may include determining properties of the pre-equalization filter, such as the pre-equalization filter's pole and zero distribution.

In various embodiments, additional steps may be added to the process loop of FIG. 6 to approximate response signatures based on these other algorithms. For example, the triangular area approximation applied in blocks 209, 212, and 218, may be applied to an impulse response in the time domain. Similarly, for frequency-time domain transforms, which may represent response signatures across three axes (e.g., frequency, time, amplitude), peaks and troughs may be approximated with volumes instead of the area calculated in the frequency response example of block 209.

In further embodiments, algorithms for approximating the signatures can also be varied. In some embodiments, for example, a signature approximation is calculated in block 406 of FIG. 8 (and in similar operations in connection with blocks 212 and 218 of FIG. 6) by summing the triangle areas, thereby yielding a signature approximation quantifiable with a single number. Signature approximations calculated in such a manner can be easily compared (e.g., signatures are included in a cluster if their area summations are within a predetermined percentage of a predetermined value). In other embodiments, features of triangles other than area are used when approximating a signature. For example, each triangle found in block 404 of FIG. 8 (and in similar operations in connection with blocks 212 and 218 of FIG. 6) can be characterized based on the length of a longest side and the measure of one or more angles in the triangle, based on triangle perimeter length, etc. Indeed, geometric shapes other than triangles can be used when approximating signatures.

In yet other embodiments, signature approximation and comparison may be replaced or augmented by direct comparison of the response signatures. Direct comparisons may be accomplished, for example, by calculating the correlation between every signature with every other signature as determined in block 122 of FIG. 6. As various examples, spectral coherence may be calculated between the frequency response signatures of block 208 in FIG. 6, or cross-correlation may be calculated between the group delay response signatures of block 211 of FIG. 6. Any algorithm that can show correlations between the pre-equalization coefficients of different access devices may be used in various embodiments to compare and group response signatures.

In various other embodiments, the sorting operations of block 123 may include grouping signatures into clusters based on the measures of correlation. In further embodiments, clusters may then be grouped into larger sets based on correlation between the signatures within different clusters. For example, signatures within a particular cluster may show a strong correlation to other signatures within the same cluster, which may be indicative of signatures of access devices on a common street (e.g., tap). Further, groups of signatures between two different clusters may show a weaker correlation, which may indicate that the two clusters are within the same neighborhood but further apart than the signatures within a common cluster. Various methods of calculating correlation (e.g., a cross correlation algorithm) may provide an indication of temporal delay between two signatures. This temporal delay may be indicative of distance on the physical communication path between the access devices. These distances may be further used to group the signatures into clusters and sets, or to further pinpoint a geospatial location of an access device.

Although the above embodiments were described in the context of a system that employs adaptive pre-equalization, other embodiments can readily perform similar methods in networks that employ adaptive post-equalization. As indicated above, embodiments are not limited to HFC networks. For example, numerous other network types employ some form of quadrature amplitude modulation and/or phase shift keying modulation, and also employ some form of adaptive equalization. Methods, systems and devices described above can readily be adapted to such networks.

In some embodiments, techniques such as are described herein can be combined with analysis of channel characteristics after equalization (or pre-equalization) has been performed. For example, analyzer 53 could be further configured to generate amplitude/frequency response, group delay/frequency response and phase delay/frequency response signatures based on the upstream communications from devices as received at hub 52. This would, in effect, indicate the effectiveness of pre-equalization performed at the access devices prior to upstream transmission. This information could be used, e.g., to identify non-linear distortions that cannot be canceled by equalization.

Embodiments also include one or more tangible machine-readable storage media (e.g., a CD-ROM, CD-RW, DVD, floppy disc, FLASH memory, RAM, ROM, magnetic platters of a hard drive, etc.) that store instructions executable by one or more processors to carry out one or more of the operations described herein. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

In some of the above embodiments, it has been presumed that the pre-equalization coefficients have been adapted to compensate for unintentional anomalies, damage, imperfections, and other distortions in the physical communication path between the associated access device and the termination system or other hub. However, as previously discussed, a cluster of access devices may be connected to a physical path of the access network in which no significant distortions are present, or in which the distortions are not consistent or distinct enough to meaningfully distinguish the access devices, which can make determining their geospatial locations difficult. In various embodiments, the access network may be configured to intentionally induce different distortions along the physical path elements (e.g., tape lines, feeder lines, trunk lines, other elements, etc.). The intentionally induced distortions may be used instead of, or in addition to, the unintentional distortions, and may be used in every way as discussed above.

Figure 13:
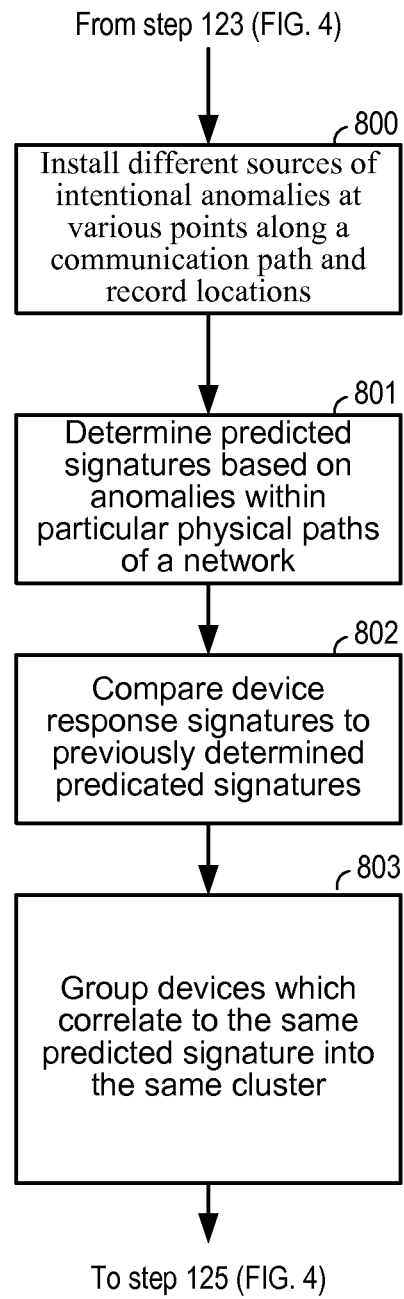
FIG. 13 is a flow chart showing further additional details of operations in the flow chart of FIG. 4 according to at least some embodiments.

Because the distortions are intentional and their properties may be known or predetermined by the design of the hardware that induces the distortions, the effects of the intentional distortions on the pre-equalization coefficients may be predicted. Accordingly, in various embodiments, the process of block 123 in FIG. 4 for grouping the signatures into clusters may be replaced or augmented by comparing the actual or estimated signature response of each access device to a predicted signature resulting from the intentionally induced distortions. FIG. 13 shows this process. In block 800 of FIG. 13, different sources of intentional anomalies are installed at various points along a communication path and the locations of the sources are recorded in a memory. For example, one path may be defined as two connected feeder lines leading from one hub to another hub. Components along this path, such as the lines themselves, amplifiers, and the like, may include circuitry installed to induce one or more intentional distortions.

In block 801, a predicted signature is determined based on one or more of the induced distortion installed within a particular physical path between a potential access device connection point and the associated termination point or hub. The predicted distortion for such a path may be the sum of those intentional distortions, which were previously installed. Various predicted signatures may be determined for different physical paths. The predicted signatures may be for every possible physical path in an access network, or may cover only a selected subset of physical paths of interest. In block 802, the estimated signatures are then compared to the predicted signatures. In block 803, estimated signatures that match a particular predicated signature to some threshold measure are then grouped into clusters. Block 125 in FIG. 4 may then be replaced, modified, or augmented to geospatially locate matched clusters or individual signatures according to the known recorded locations of the intentional distortions within the physical paths of the access network.

Figure 14:
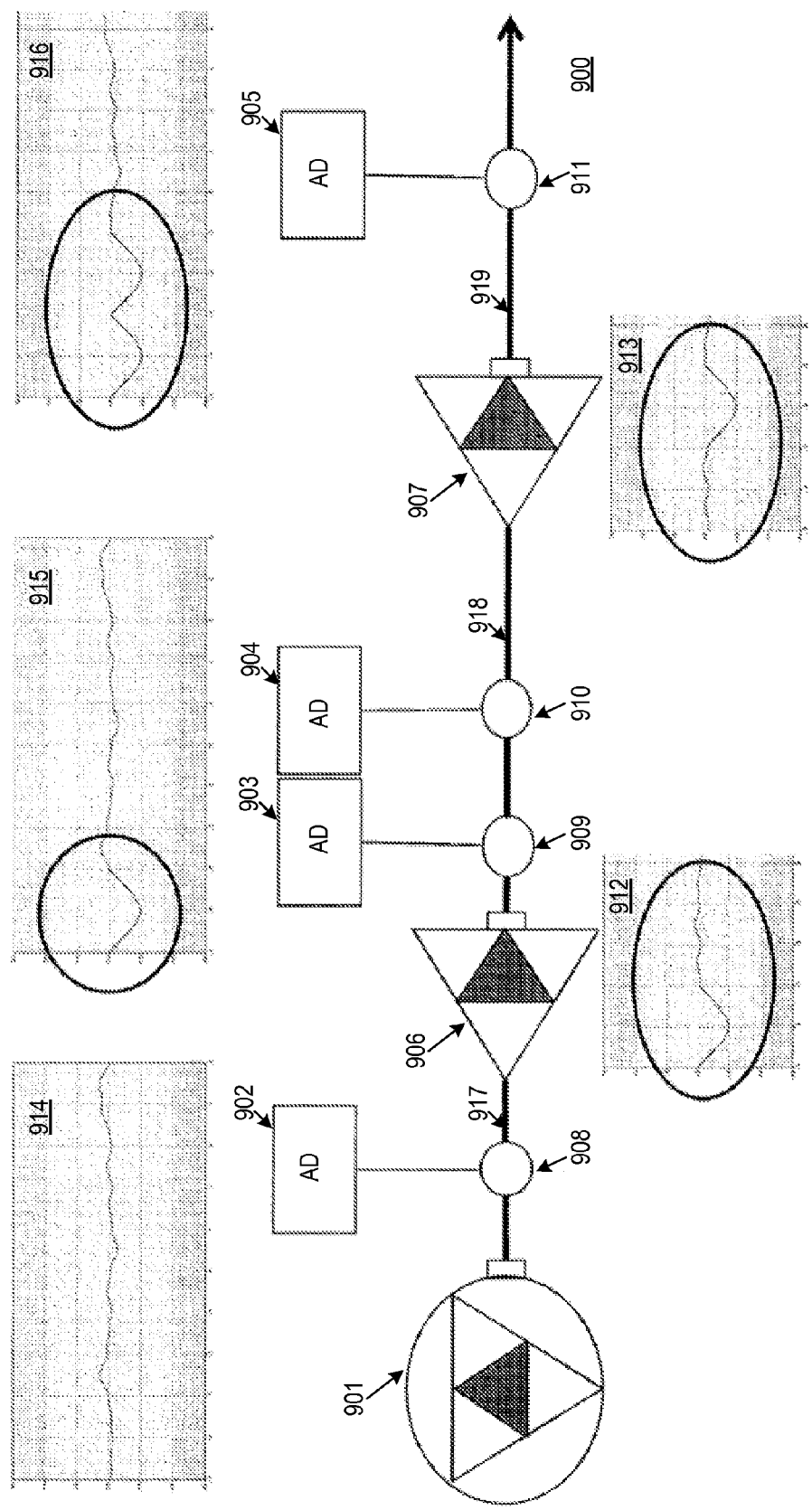
FIG. 14 shows an illustrative communication path according to at least some embodiments

FIG. 14 illustrates one example of an embodiment, which includes communication path 900 of an access network. Path 900 includes return path amplifiers 906 and 907 cascaded along the path, which terminates at node 901. Node 901 may be a termination device such as a CMTS, optical node, or some other termination device. Access devices 902 through 905, which may be modems, gateways, or other network devices, are connected to taps 908 through 911 respectively of branch 900, and each access device includes transceivers for transmitting and receiving signals through the access network. In various examples, the termination device 901 detects distortions in communication signals received from the access devices 902 to 905, determines pre-equalization coefficients for each access device, and transmits the determined pre-equalization coefficients to the access devices so that the access devices may pre-equalize their transmitted signals to compensate for the distortions occurring in their respective signals.

Figure 15A:
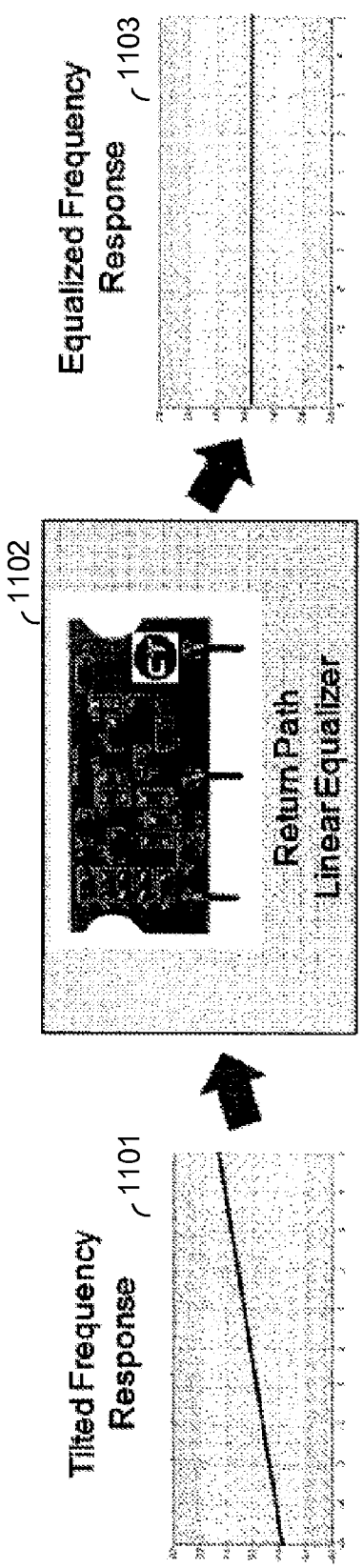
FIG. 15A-15C shows frequency response and circuit characteristics of a linear equalizer with a frequency notch according to at least some embodiments.

Return path amplifiers 906 and 907, may include linear equalizer hardware, which compensates for tilt in the amplifier frequency response. Frequency tilt is known to occur in amplifiers of various networks such as HFC networks. FIG. 15a illustrates the function of the linear equalizer, with the plot 1101 on the left illustrating a typical frequency response of the return path amplifiers. The vertical axis is gain of the amplifier, and the horizontal axis is frequency. After inserting a linear equalizer 1102 (shown in the center of FIG. 15a) into the amplifier, the frequency response is flattened as illustrated in the plot 1103 on the right.

Figure 15B:
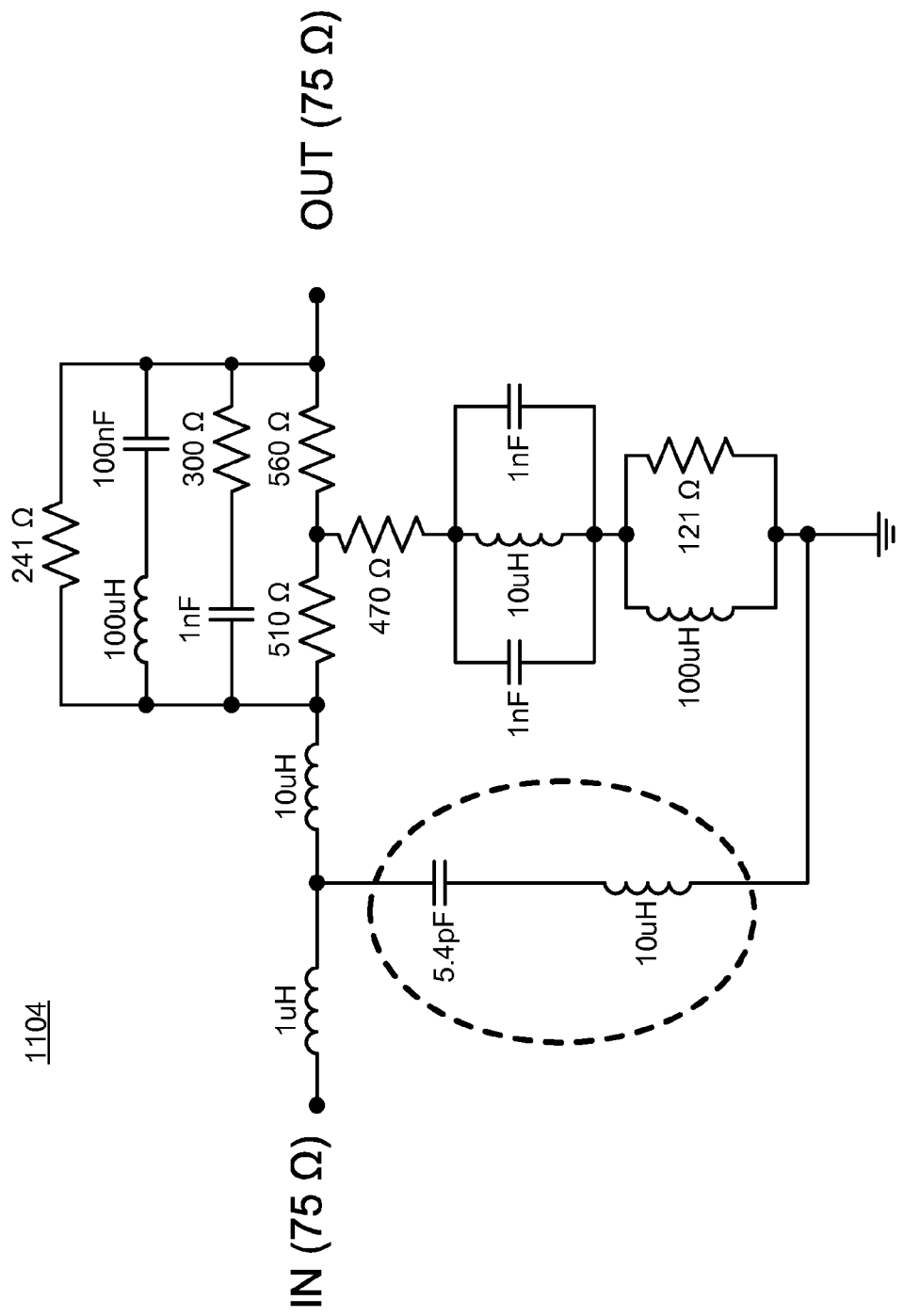
Figure 15C:
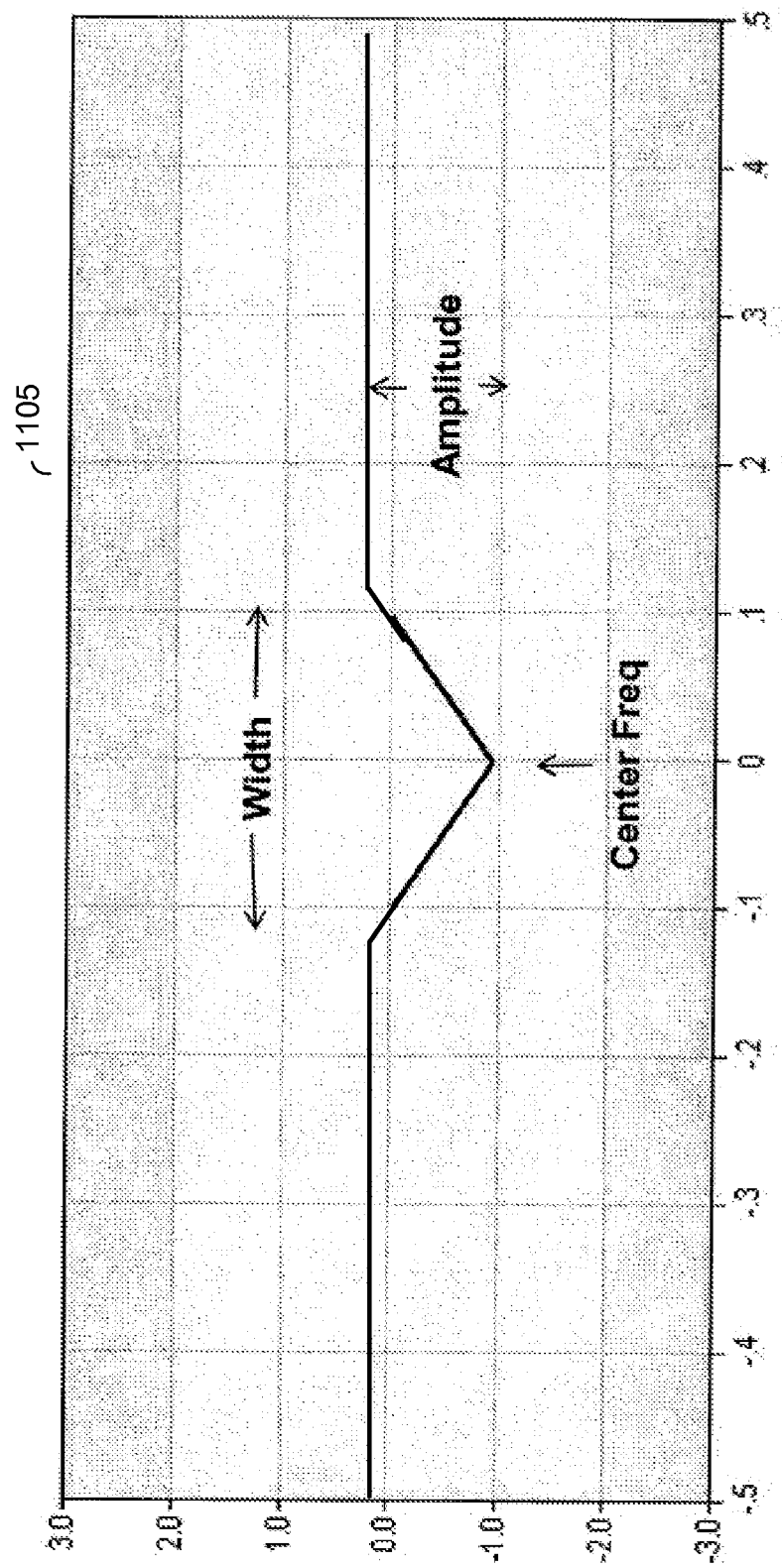

In various embodiments, intentional distortions (e.g., anomalies) may be induced with an electrical circuit, which replaces the linear equalizer. The new electrical circuit may perform the same function as the replaced linear equalizer, but may also induce a distortion, which may be for example, a notch at a particular frequency. In various embodiments, the equalizer may be removable, or may be a permanently installed in the amplifier. FIG. 15B illustrates one of many such embodiments of the linear equalizer 1104 modified to include a tunable notch. For clarity, a dotted ellipse encloses the additional circuitry to induce the notch. FIG. 15C provides an illustrative frequency response 1105 of the modified linear equalizer with tunable notch. The vertical axis in the graph of FIG. 15C represents gain in decibels (dB). The horizontal axis represents frequency, which has been normalized to a channel width of 1 and a center frequency of 0. While the channel width and center frequency will depend on the application, in one such example, the channel may be a 6.4 MHz channel centered on a 22 MHz carrier frequency. By varying the component values illustrated in FIG. 15B, the width, amplitude, and center frequency of the notch may be tuned to specific values. In the case of FIG. 15C, the notch is tuned to have a width of 1.8 MHz (0.2*6.4 MHz), an amplitude of −1 dB, and a center frequency of 22 MHz (i.e., the center of the channel).

The intentionally induced distortions (e.g., notches) may have the effect of reducing the signal to noise ratio of the transmitted signals, and the pre-equalization by the access device may have the effect of improving the signal-to-noise ratio of that signal path. The effect of the distortions may be different for different types of signaling carried over the path (e.g., 16 QAM, 64 QAM, OFDM, FM). In various embodiments, the shape of the intentionally induced distortions and related hardware may be adapted to the type of signaling carried over the path and may be adapted such that the reduction in signal-to-noise ratio will be within acceptable limits of the system design as to not significantly degrade performance of the system. In various other embodiments, the intentionally induced distortions may be such that the distortions may be compensated for by the pre-equalization coefficients of standard access devices to be connected to the network.

Returning to FIG. 14, return path amplifier may have linear equalizers with tunable notches installed, with the notch of each amplifier tuned to different parameters. The notch of amplifier 906 may be as illustrated in plot 912 and the notch of amplifier 907 may be as illustrated in plot 913. For example, the notch of amplifier 906 may be tuned to a center frequency of −0.4 (i.e., −2.56 MHz) from center, and the notch of amplifier 907 may be tuned to a center frequency of −0.2 (i.e., −1.28 MHz) from center. In this example, the notches have been tuned to different center frequencies so that they may be distinguished from one another.

As previously discussed, the access devices 902 through 905 transmit upstream signals to the termination node 901, and those signals are distorted by the induced anomalies on path 900. The signals will only be distorted by the anomalies of the amplifiers through which the signals pass. Accordingly, the frequency response of the signal path for access device 902, whose signals do not pass through an amplifier to reach the termination node 901, will be as shown in plot 914. Plot 914 includes only unintentional distortions along the path. The signal path for access devices 903 and 904 passes only through amplifier 906, and will have the frequency response as shown in plot 915. Plot 915 includes both the unintentional distortions induced along the path and the intentionally induced notch shown in plot 912. The signal path for access device 905 includes both amplifiers 906 and 907, and thus the frequency response of the path is as shown in plot 916. Plot 916 includes unintentional distortion along the path, and both notches, which are induced at amplifiers 906 and 907. While in this example, a single string of two cascaded amplifiers and four access devices is shown, the network may have other segments, which are branched off in parallel to form a tree structure with other parallel strings of amplifiers that are joined at common nodes, with any number of amplifiers and access devices.

As previously discussed, the pre-equalization coefficients for each access device or a subset of devices will be adjusted according to the frequency response of each access device's signal path as shown in plots 914-916. In the example shown in plot 916, the notches induced by amplifiers 906 and 907 can be distinguished by their center frequencies. The response signature derived from the pre-equalization coefficients of access device 905, may uniquely and predictively indicate the path response 916 having the two distinct notches. Likewise, the response signatures of access devices 903 and 904 will reflect the path response having just the single notch of plot 915, and the response signature of access device 902 will reflect the path response of 914.

In various alternatives, the access device may be determined to be connected to the respective segments as shown in FIG. 14 by correlating path responses 914, 915, and 916, to segments 917, 918, and 919 of path 900, respectively, and using the various embodiments discussed above.

Figure 16:
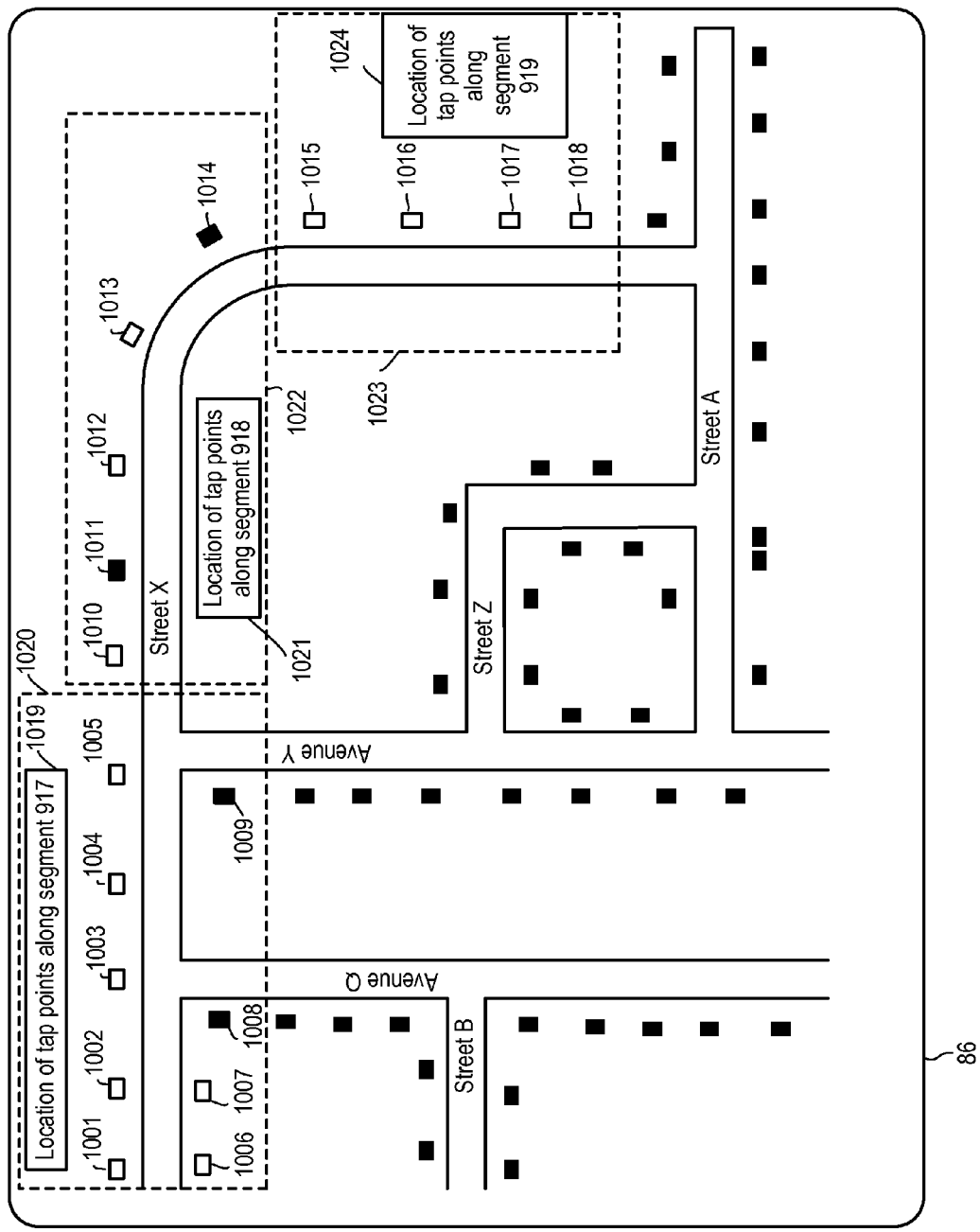
FIG. 16 shows illustrative analyzer output displays according to some embodiments.

Because the hardware used intentionally to induce the distortions is placed in a known location along path 900, the geospatial location of each respective segment and the tap points along the segments may be identified. The above embodiments may be performed with analyzer 53 of FIG. 3. In various embodiments, analyzer 53 may simply identify the tap points on display 86, may list the tap points in a file saved in memory 82, or may output the list through interface 83 to another device such as a printer, or remote computer (e.g., a web page), or other device. In various alternatives, the locations of the tap points may be identified in a text document, database, or in a map image as shown in FIG. 16. The map image in FIG. 16 is similar to those in FIGS. 9A-9C. In some examples, as shown in FIG. 16, analyzer 53 provides a display showing an area (box 1020) in which all tap points along segment 917 may be located and one or more corresponding dialog displays 1019. In certain alternatives, analyzer 53 may only highlight the authorized or known devices (1001-1007 in the present example) having a response signature associated with segment 917, while other unauthorized or unknown devices (e.g., houses 1008 and 109 in the present example), may not be highlighted. The map may similarly display areas 9 (boxes 1022 and 1023) enclosing tap points of other segments 918 and 919 which are identified with the induced distortions, and present one or more other corresponding dialog displays 1021 and 1024. If an unauthorized device is identified to have a response signature similar to that of one of the segments 917, 918, and 919, the location of that unauthorized device can be narrowed down to those identified within the segments respective area.

Figure 17:
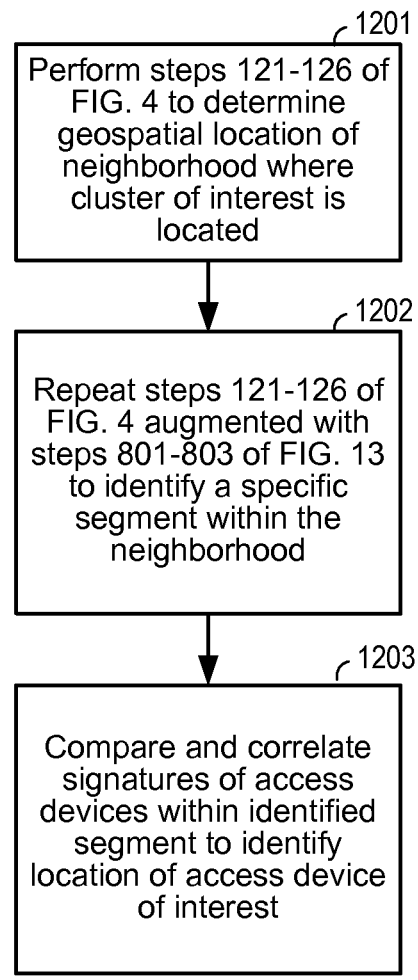
FIG. 17 illustrates one embodiment for locating a device in a network.

The embodiments utilizing the intentionally placed distortions may be combined with the embodiments utilizing the unintentional distortions further to narrow the possible location of a specific access device. For example, a provider may have 16 standard intentional distortion circuits, which produce 16 unique distortions, and these 16 circuits may be used in every neighborhood within the network. FIG. 17 illustrates one embodiment for locating a device in such a network. In block 1201 of FIG. 17, a particular access device may first be determined to be within a cluster of access devices located within the neighborhood of FIG. 16 based on unintentional distortions using the embodiment illustrated in FIG. 4. Using FIG. 4, a cluster of access devices may be geospatially located within one neighborhood and may be distinguished from clusters of other neighborhoods.

Once the cluster is located within the neighborhood, the embodiment of FIG. 4 may be repeated and augmented with the embodiment of FIG. 13 at block 1202 on just those access devices within the located cluster. Recall that FIG. 13 utilizes the intentional distortions to locate an access device along a specific segment of the network. Thus, once the access device is determined to be located within the neighborhood of FIG. 16, the access device may be determined to be within area 1022 along segment 918 within the neighborhood, based on intentional distortions, which uniquely identify segment 918. Because, only access devices within the neighborhood are analyzed, the intentional distortions will not be confused with similar intentional distortions of other neighborhoods.

In block 1203, the response signatures of just those devices within area 1022 may further be compared to find correlations in response signatures between the unauthorized/unknown device and the authorized/known devices in area 1022. The closer two devices are spatially located along the signal path relative to a source of a signal distortion (e.g., an intentional distortion or unintentional distortion) the greater the correlation may be between the signatures of the two devices. Because the precise locations of the authorized/known devices are known, the relative distances along segment 918 between the unauthorized device and the authorized devices may be estimated based on the relative measures of correlations between the unauthorized/unknown device and the authorized/known devices.

For example, in block 1203 the response signature of an unknown device of interest may show a stronger correlation to the response signature of a known device located at 1013 than to the response signature of a known device located at 1010. Analyzer 53 or another computing device (e.g., a laptop) may be programmed to produce and analyze the correlation data and determine that the unknown device is located at 1014 where no authorized device is known to exist (e.g., an unauthorized cable modem connected by a non-customer), or that the unknown device is co-located at location 1013 where an authorized device already exists (e.g., an extra unauthorized set-top box connected by a current customer at 1013).

As further example in block 1203, because the locations of the intentional distortions are also known, the signatures of devices may be compared to determine whether an unknown device is closer or more distant to the intentionally induced distortion than a known device along same communication path. For example, analysis of the response signatures of an unknown device and a known device located at 1012 may indicate that the unknown device is located closer to an intentional distortion located at the left edge of area 1022 than the known device located at 1012. Analyzer 53 or another computing device (e.g., a laptop) may be programmed to analyze the signature data and compare the distances to the intentional distortion and determine that the unknown device is located at 1011 where no authorized device is known to exist (e.g., an unauthorized cable modem connected by a non-customer). Alternatively, the unknown device may be determined to be co-located at location 1010 where an authorized device already exists (e.g., an extra unauthorized set-top box connected by a current customer at 1010).

In the embodiments above, which include both unintentional signal distortions and intentionally induced signal distortions, the combined effects of the signal distortions should be such that the distortions do not disturb communication between the access devices and the termination hub to the point where communication is inhibited or degraded to the point where the network is no longer suitable for its designed communication rates. Accordingly, in various embodiments, the parameters of the intentional distortions (e.g., center frequency, width, etc.) may be set based on the communication application and signaling requirements (e.g., minimum/maximum bitrate, signal-to-noise ratio, etc.).

While in the above example, the intentional distortions are induced with a modified linear equalizer inserted into an amplifier, numerous other modifications, as is readily apparent, can be made to the access network using passive and active electronics, connectors, cables, etc. to induce distortions into the network. Further, while the distortion in the above example is a single notch, any induced distortion may be used, such as (but not limited to) inducing multiple notches, inducing peaks, or inducing various combinations thereof. Still further, the induced distortions in the examples above were fixed, but in various other embodiments, the notch may be remotely programmable using electronics, which include a communication capability through the access network, or through some other network.

In certain instances, unintentional distortions may not be sufficient to locate a particular access device, and circuits for inducing intentional distortions may not be present or may not distinguish signals between groups of segments in a particular branch/segment of a network. In such cases and in other circumstances, various embodiments may be employed to introduce a momentary distortion into a particular network segment. As described below, momentary distortion may be induced by temporarily connecting an additional distortion component to the particular segment, so that the signatures of the access devices connected to the segment compensate for the distortion. In such embodiments, momentary changes in the signature or signature approximation of an access device may be detected to determine if the access device is located in the particular segment, or downstream from the particular segment, in which the momentary distortion is introduced.

Figure 18A:
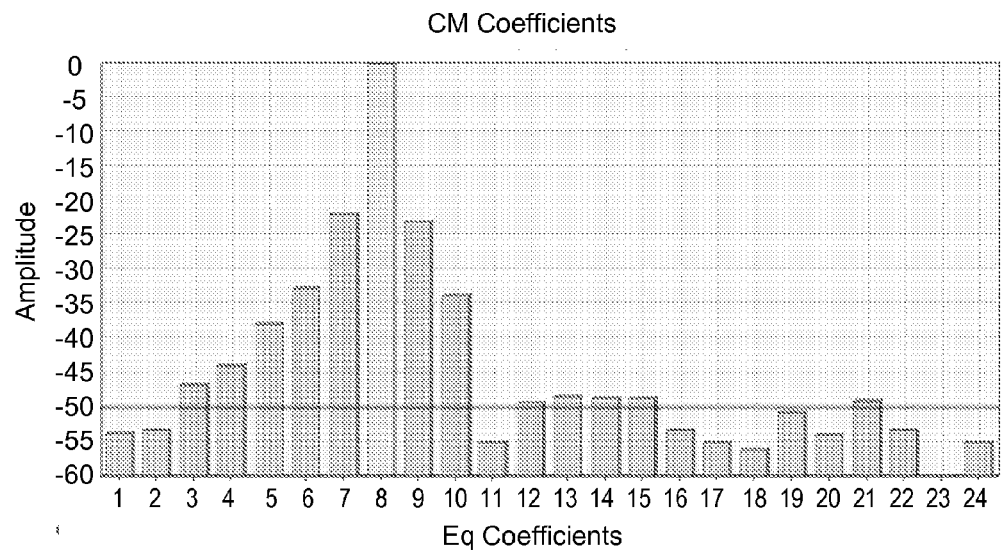
FIGS. 18A-21B illustrate response signatures for communication paths in an access network according to various embodiments.
Figure 18B:
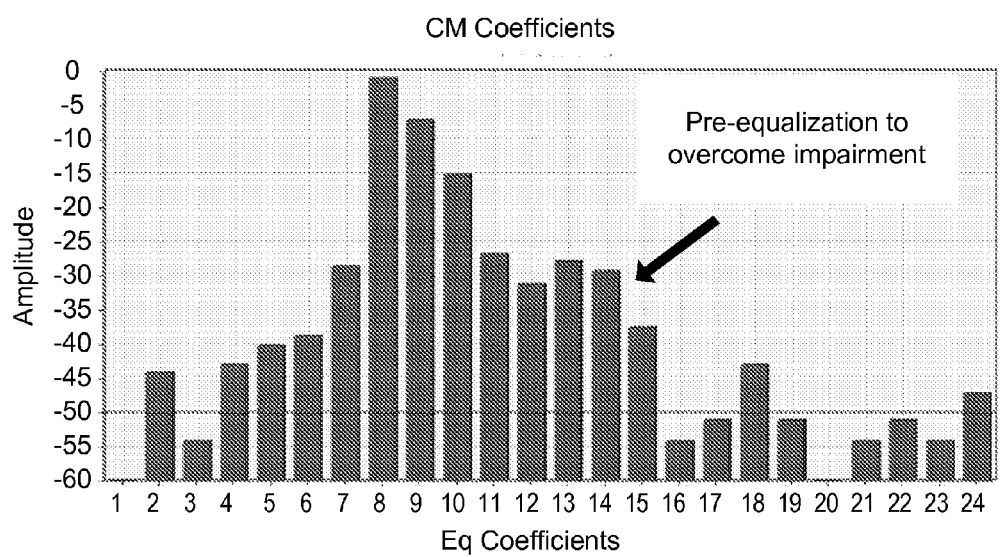

For example, pre-equalization coefficients of an access device may be used as a signature. Such coefficients, which may be displayed by analyzer 53, are shown in FIG. 18A. In FIG. 18A the equalization coefficients are shown along the x-axis. The amplitudes of each coefficient are shown along a y-axis. The z-axis illustrates each coefficient at successive intervals of time. FIG. 18B illustrates the same coefficients, but during when a momentary distortion is induced on the network path in which the access device is connected. As shown in FIG. 18B, the coefficients changed from previous values illustrated in FIG. 18A. This change may autonomously be detected by analyzer 53, or another computing device, and recorded and/or displayed to indicate that the access device is connected to the path on which the distortion is induced. In one illustrative example, analyzer 53 may detect the change by subtracting the current value of each pre-equalization coefficient from the previous value, and then calculating the mean square sum of the differences. The mean square sum may then be compared to a predetermined threshold value to determine whether a single distortion is being induced on the communication path, on which the access device is connected and/or communicating.

Figure 19A:
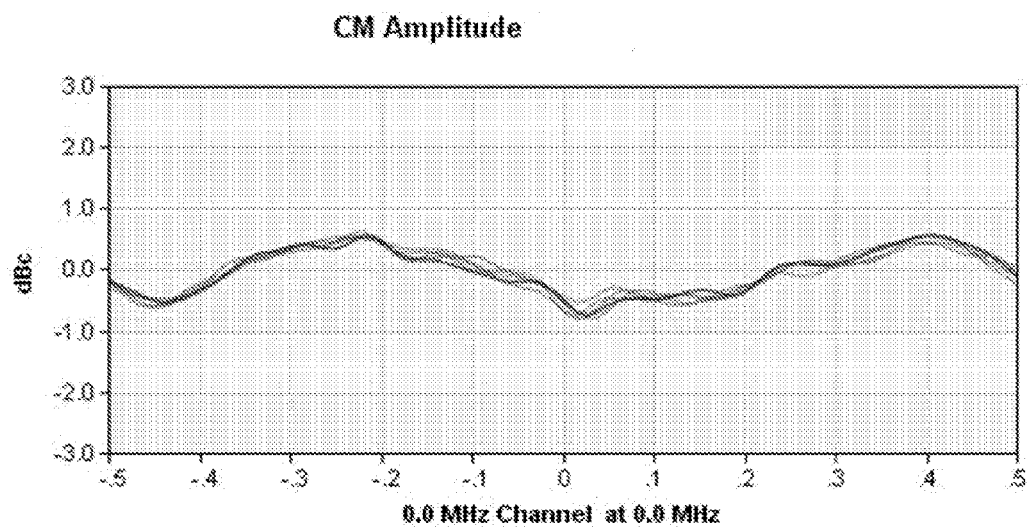
Figure 19B:
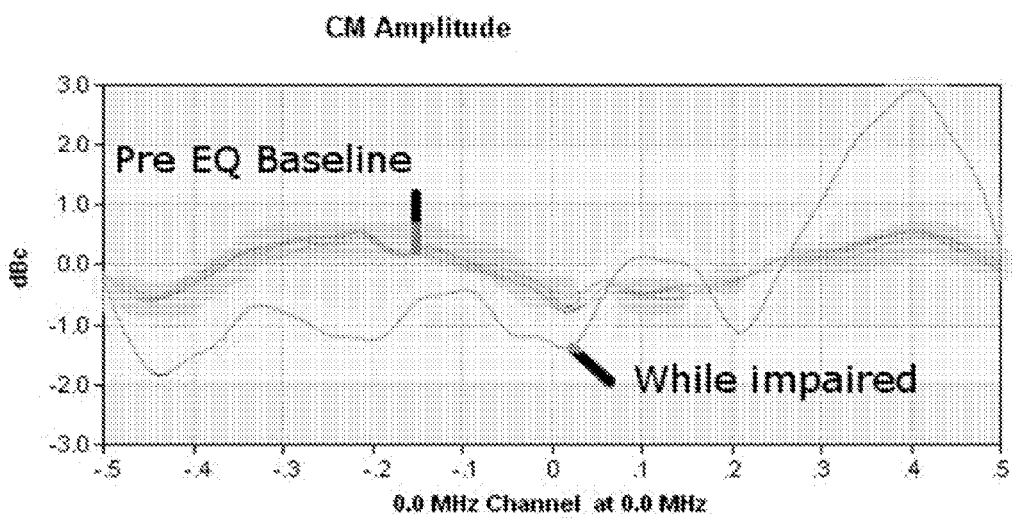

FIG. 19A illustrates a frequency/amplitude response of a device, which may, as previously discussed, also be used as an access device signature. FIG. 19A illustrates a baseline signature before a momentary distortion is induced. FIG. 19B superimposes over the baseline signature a subsequent frequency/amplitude response while the signal distortion is being induced. The change between the baseline signature and the subsequent signature may be autonomously detected, recorded, and/or displayed by analyzer 53, or other computing device, to determine that the access device is connected to or communicating on the path in which the distortion is induced.

Figure 20A:
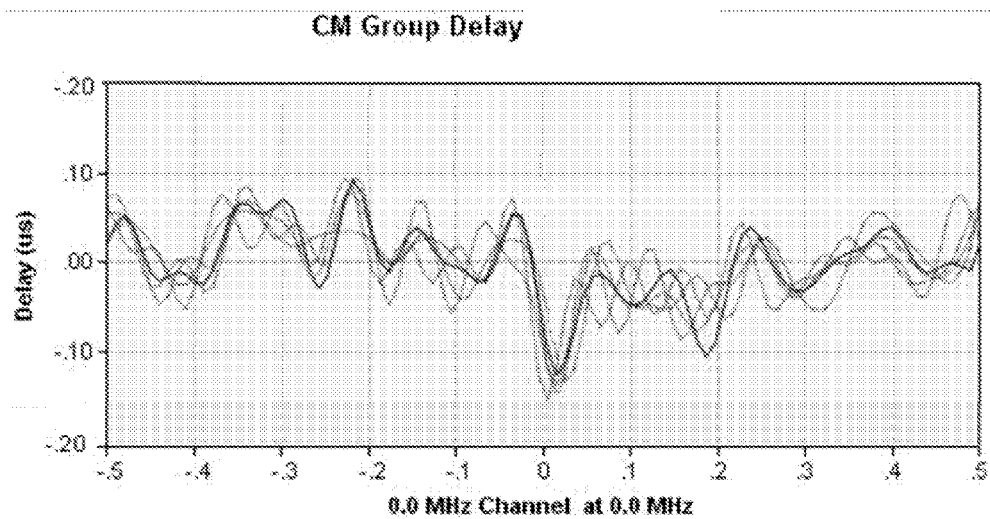
Figure 20B:
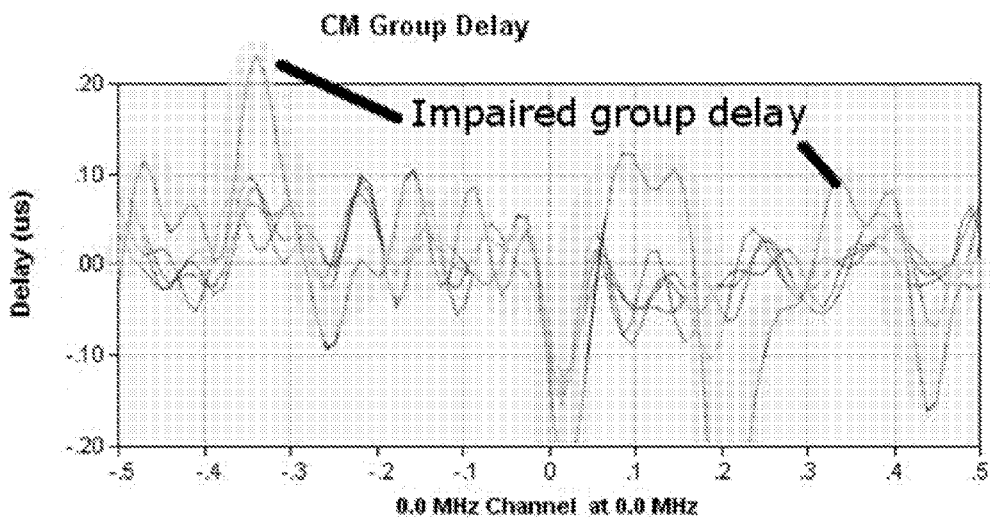
Figure 21A:
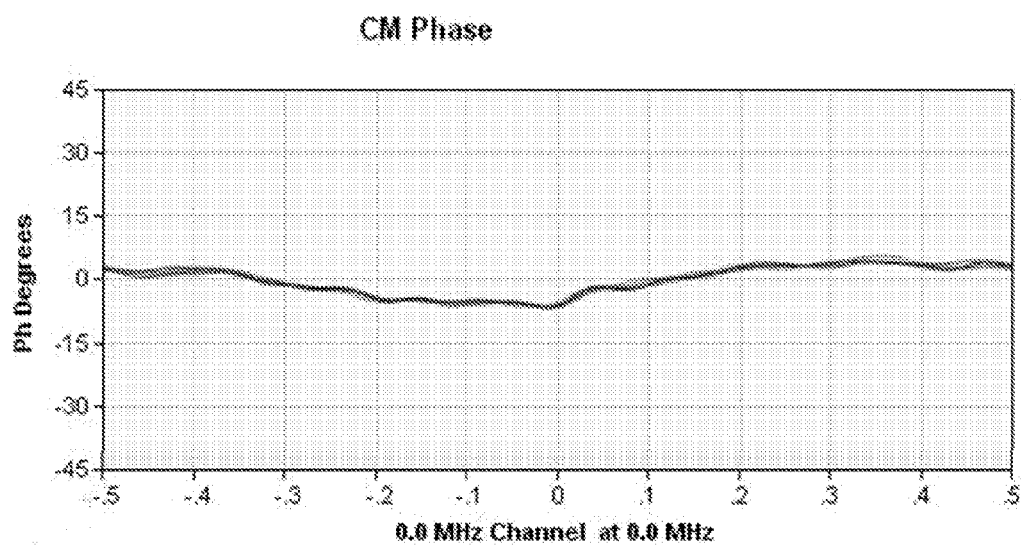
Figure 21B:
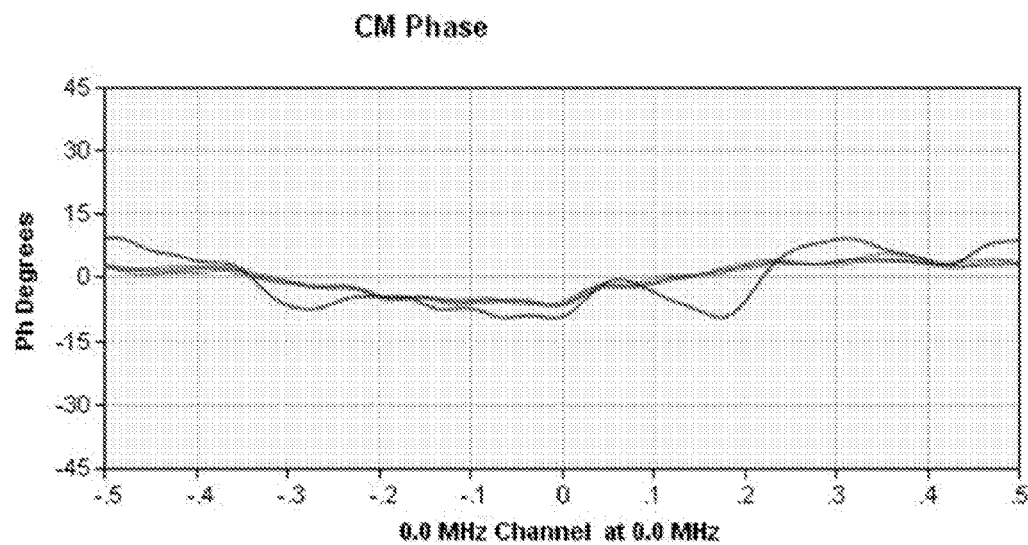

FIGS. 20A and 21A illustrate other baseline signatures, which include the previously discussed group delay response and the phase response of an access device, respectively. FIGS. 20B and 21B superimpose over the baseline response signatures subsequent group delay and phase responses measured while the signal distortion is induced over the baseline response signatures. Like the frequency/amplitude response, the changes between the baseline and subsequent signatures of FIGS. 20 and 21 may be autonomously detected, recorded, and/or displayed by analyzer 53 or other computing device, to indicate that the access device is connected to the path in which distortion is induced. In various embodiments, the baseline and subsequent waveforms of the frequency/amplitude response, group delay response, and phase response may be subtracted from one another and the absolute value or square of the difference may be integrated over frequency. The integrated value may then be compared to a predetermined threshold value to determine whether a signal distortion is being induced on the communication path on which the access device is connected to or is communicating on. Any other algorithm, which detects a change between the baseline and subsequent signatures, may also be utilized.

Figure 22:
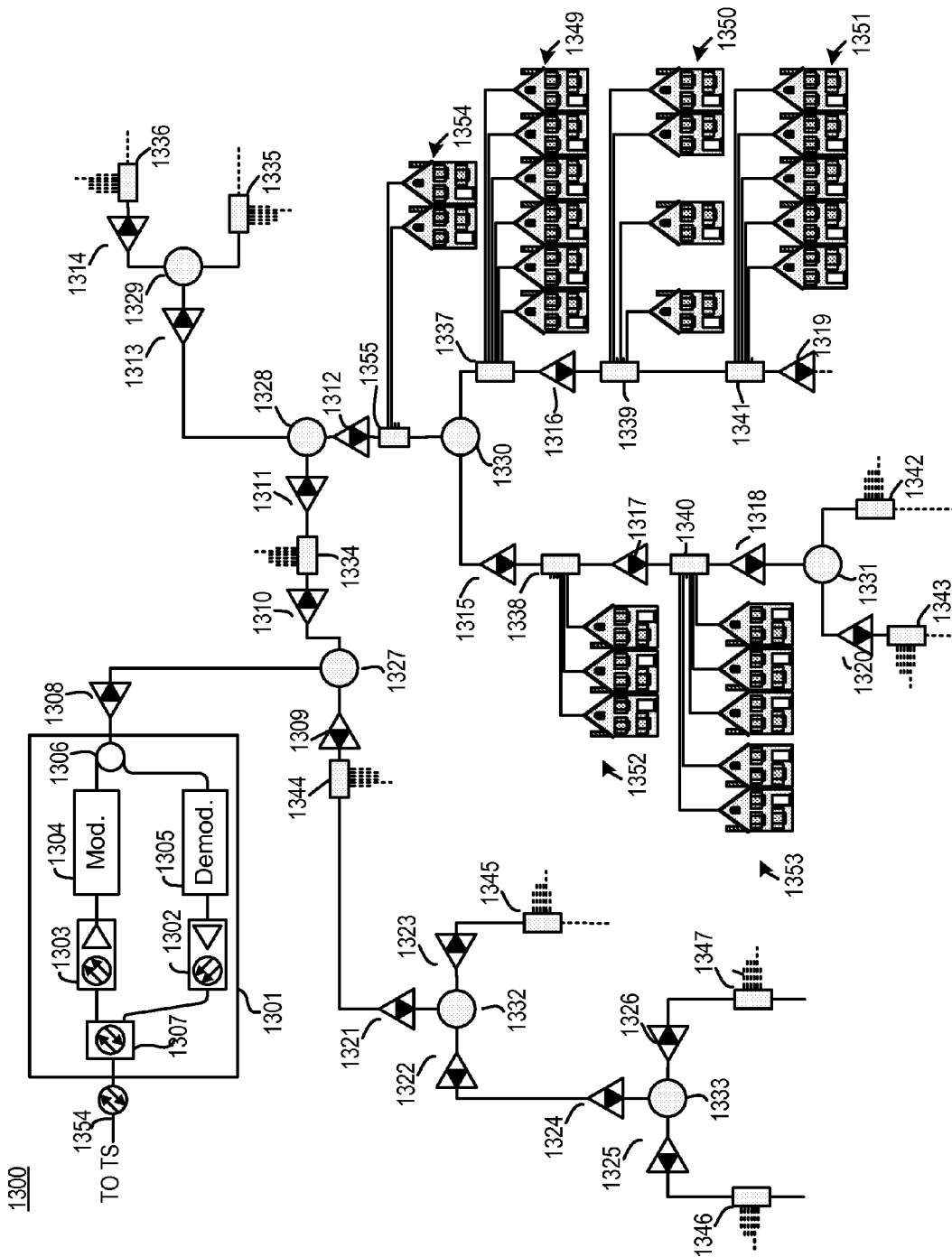
FIG. 22 illustrates one embodiment of a communication network.

FIG. 22 illustrates communication network 1300 on which momentary distortions may be induced to detect and find an unknown/unauthorized device or other device of interest. Network 1300 may for example be a portion of a hybrid coax/fiber network or any other type of network. The following is an illustrative, non-limiting description using component relative to a particular network, though other networks and components may be used. Network 1300 begins at 1354, which may for example, be a bidirectional fiber-optic communication path connecting a cable modem termination system (not shown) to a fiber-optic/coax node 1301. Node 1301 includes optical combiner/splitter 1307, which transmits downstream optical signals to optical/RF converter 1303, which then drives modulator 1304, which then transmits RF signals onto the coax network. Node 1301 also includes the modulator 1305, which demodulates RF signals received from the coax network and transmits that demodulated signals to RF/optical converter 1302, which then transmits the converted upstream signals to combiner splitter 1307, which then transmits the upstream signals to the cable modem termination system via optical path 1354.

The coax portion of network 1300 may include a plurality of communication paths interconnected by a plurality of amplifiers 1308-1326, combiners/splitters 1327-1333, and taps 1334-1347 and 1355. Connected to each tap may be a plurality of access devices, such as modems, set-top boxes, etc. Groups of access devices 1349-1354 located in different residences (e.g., apartment, condominium, single family home, duplex, office, plant, etc.) are illustrated as connected to taps 1337-1340 and 1355 respectively. Each residence may also include multiple access devices. Taps 1334-1336 and 1342-1347 may also include connected access devices, which are not illustrated for convenience. While the coax portion of network 1300 illustrates one topology, other illustrative networks may include additional amplifiers, combiners/splitters, taps, and communication paths, which may connect hundreds, thousands, or tens of thousands of access devices to the network. Additionally, the network may include other optical nodes supporting other coax portions, which are not shown for convenience.

Figure 23:
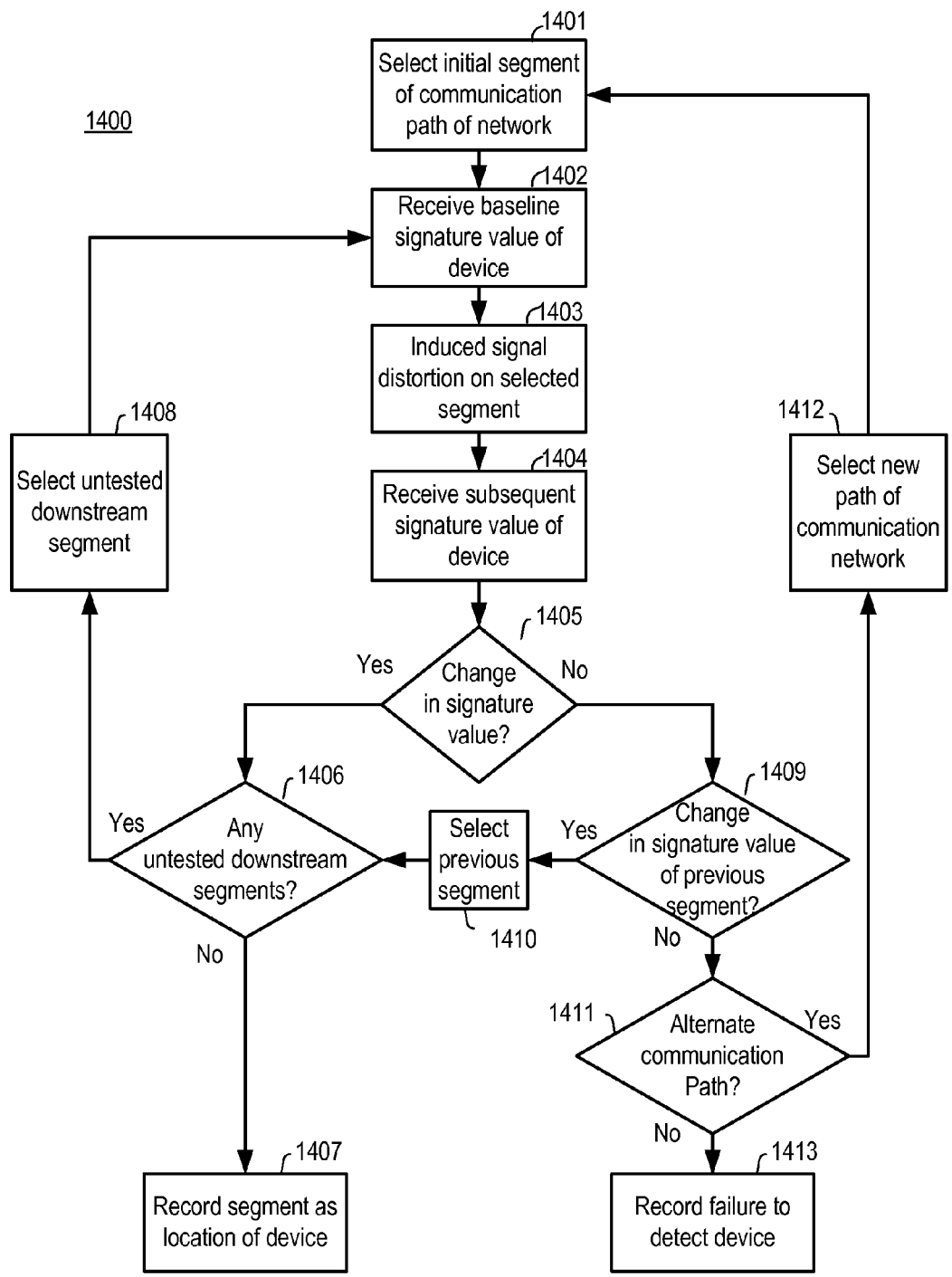
FIG. 23 illustrates one embodiment for inducing momentary distortions along different segments of the communication network of FIG. 22 to locate an access device of interest.

FIG. 23 illustrates one illustrative embodiment 1400 for traversing communication network 1300 and inducing momentary distortions along different segments of the network to locate the access device of interest. Embodiment 1400 begins at block 1401 were an initial segment of a communication path of the network is selected to determine whether the access device communicates through that selected segment. As one example, this initial segment may be the path connecting amplifier 1308 and combiner/splitter 1327. After selecting the initial path, one or more baseline signature values of the access device of interest are received in block 1402. The baseline signature values may be remotely received and stored by analyzer 53 or another computing device from the cable modem termination system or from some other remote server connected to the network. These signatures may be as illustrated in FIGS. 18A 19A, 20A, 21A, or may be any of the other previously discussed signatures or signature approximations. Once the baseline signature values of the access device are received, a momentary signal distortion is induced on the selected segment at block 1403 by, for example, temporarily inserting an additional distortion component to the segment (as explained below).

As with the previously discussed signal distortions, the momentary signal distortions will cause the signatures or signature approximations of access devices connected to or downstream from the segment on which the momentary signal distortion is introduced will be adjusted to compensate for the signal distortion. For example, a CMTS or other termination system may monitor communications from cable modems. Based on quality of the received signals, the termination system individually determines and provides pre-equalization tap coefficients (i.e., signature values) to be used by each modem for upstream communications. The termination system can thus maintain a record of the tap coefficients each modem is currently using.

The momentary signal distortion should be such that a measurable change in signature is detectable, but should not inhibit or degrade communication through the network to the point where the network is no longer suitable for its designed communication rates. Accordingly, in various embodiments, the parameters of the monetary signal distortions (e.g., center frequency, width, duration of inducement, etc.) may be set based on the communication application and signaling requirements (e.g., minimum/maximum bitrate, signal-to-noise ratio, etc.).

Figure 24A:
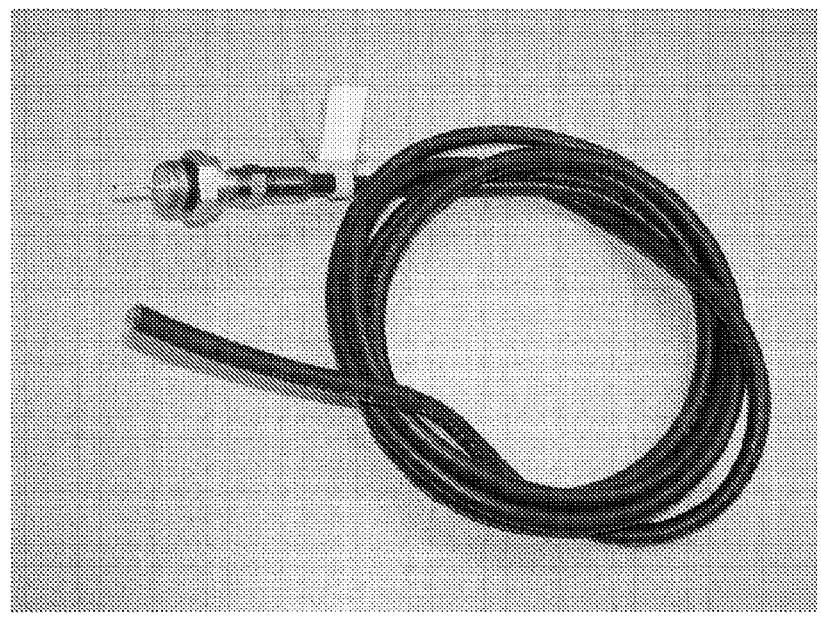
FIG. 24A illustrates one embodiment of a notch trap filter.
Figure 24B:
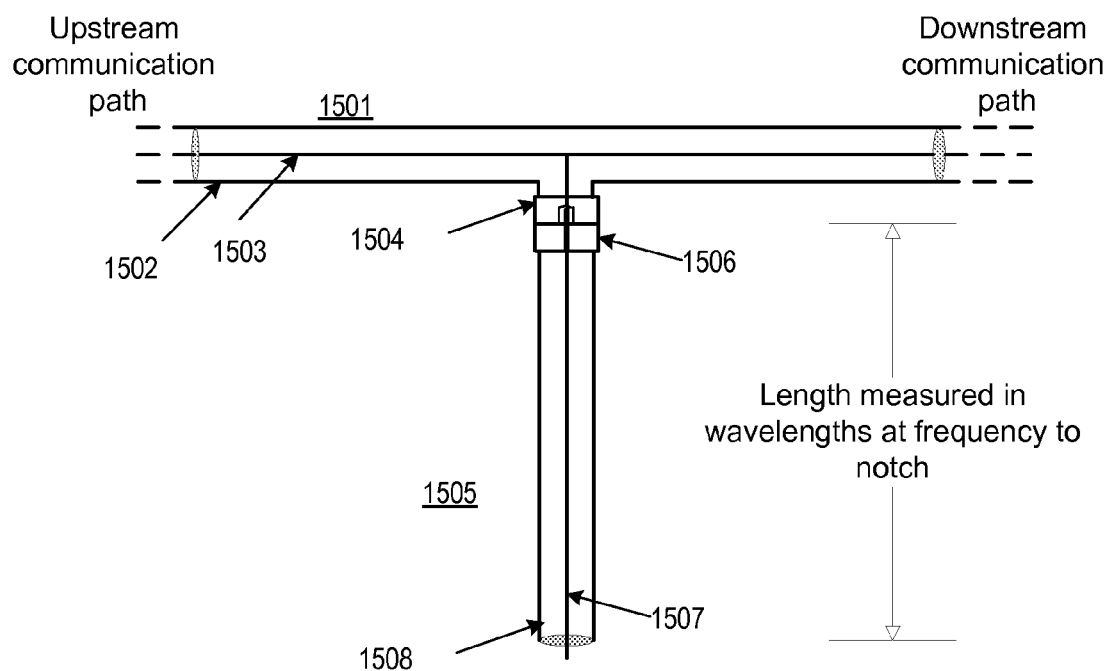
FIG. 24B illustrates a schematic representation of the notch trap filter of FIG. 24A connected to a communication path.

One illustrative embodiment for inducing the momentary signal distortion includes connecting a quarter-wave-length notch trap filter (e.g., band stop filter) to the communication path on which the access device of interest may communicate. An illustrative quarter-wave-length notch trap filter is shown in FIG. 24A. FIG. 24B schematically illustrates the notch trap filter of FIG. 24A connected to a communication segment of network 1300. The illustrated embodiment consists of an unterminated coax cable 1505, which may be connected in parallel to the communication path 1501 through a connector 1506 located at end of the cable, and which may be left un-terminated at the other end of the cable. The connector 1506 of the notch filter couples the center conductor 1507 and shield 1508 of the notch filter to the center conductor 1503 and shield 1502 of the communication path, respectively, via the coupling connector 1504 of the communication path. Connectors 1504 and 1506, for example, may be standard F-connectors.

When connected, the notch trap filter generates a frequency notch distortion, which passes most frequencies unaltered, but attenuates those signals within in a specific range at a designed center frequency. The center frequency of the notch is determined by the electrical length of the unterminated coax cable, which equals one quarter of the wavelength of the center frequency. For example, assuming a coax cable that has a velocity of propagation of 85%, the length in feet of the unterminated coax may be approximately found by dividing 209 by the desired center frequency of the notch in megahertz. So for example, in one embodiment, inducing a frequency notch signal distortion at 1.2 MHz away from a carrier signal frequency of 23.2 MHz (i.e., 22 MHz), would require an unterminated coax cable length of approximately 9.5 feet (i.e. [¼*0.85*985 ft/microsecond]/22 MHz).

While one illustrative embodiment of hardware for inducing a momentary distortion is provided, various other embodiments may be used. For example, an alternative embodiment may include the modified linear equalizer of a FIG. 15B, which may be configured to temporarily connect to each segment of the network for inducing the momentary distortion. In another alternative embodiment, the hardware may be tunable to adjust the distortion so that a change in signature is more readily detectable, by causing the signature to vary over time.

The effect of the momentary distortion may be different for different types of signaling carried over the path (e.g., 16 QAM, 64 QAM, OFDM, FM). In various embodiments, the shape of the intentionally induced distortions and related hardware may be adapted to the type of signaling carried over the path and may be adapted such that the reduction in signal-to-noise ratio will be within acceptable limits of the system design as to not significantly degrade performance of the system.

Returning to FIG. 23, while the signal distortion is momentarily induced in block 1403, one or more subsequent signature values of the access device are received in block 1404 in the same manner as the baseline values in block 1402 by analyzer 53 or other computing device. The momentarily induced signal distortion need only be maintained for a time sufficient for subsequent signature values to adapt to the distortion and be received. The subsequent signature values may be as illustrated in FIGS. 18B, 19B, 20B, 21B, or may be any of the previously disclosed signatures or signature approximations. Once one or more subsequent signature values are received, the subsequent values are compared to the baseline values in block 1405 to determine if a change in the signature values has occurred. In various embodiments, detection of a change in signature value may be performed autonomously by analyzer 53, or by another computing device, as previously discussed with respect to FIGS. 18A through 21B. The analyzer or other computing device may periodically receive the values of the adaptive equalization parameters and receive times when the signal distortion is induced. The analyzer may determine which periodically received parameters are baseline values and which are subsequent values based on the times of the signal distortion. The baseline and subsequent signatures and the change in signature may also be displayed on a display device by analyzer 53, or by another computing device.

If a change in the signature value of the access device of interest is detected, the embodiment proceeds to block 1406 to determine if any downstream segments of the communication path exist and have not yet been tested. Downstream segments may be autonomously determined through the use of a stored network map, which describes the interconnection of the segments, hardware, and/or access devices having known locations within the network. For example, if the signal distortion is induced at a current segment between amplifier 1308 and combiner/splitter 1327, two downstream segments exist from the currently selected segment of the communication path. These include the segment between combiner/splitter 1327 and amplifier 1309 and the segment between combiner/splitter 1327 and amplifier 1310. If both of these downstream segments have already been tested or no downstream segments exist, embodiment 1400 ends at block 1407 by recording the currently tested segment as the location of the access device. The recording may be autonomously performed by analyzer 53 or another computing device, and/or displayed on a display device.

At block 1406, if one or more downstream segments are determined to exist and are untested, block 1408 selects one of the untested downstream segments for testing. After block 1408 selects a new segment, blocks 1402 to 1405 are repeated. Analyzer 53 or another computing device may store the results of each sequential pass of blocks 1402 to 1405 for later analysis.

Returning to block 1405, if a change in the signature value of the access device of interest is not detected, then the selected segment, and all segments downstream from the selected segment, may be eliminated as a possible communication path of the access device. Analyzer 53 or another computing device may autonomously record the segments to eliminate based on the stored network map and results of block 1405. If a change in the signature is not detected at block 1405, than block 1409 determines if the preceding selected segment had detected a change in the signature of the access device of interest. This preceding detection may have been previously recorded, and may be retrieved from a memory of analyzer 53 or other computing device. At block 1409, if a change in the signature of the previously selected segment was detected, than the previous segment is re-selected as the current segment in block 1410, and then block 1406 repeats to determine if there are any remaining untested downstream segments. For example, if the segment connected between combiner/splitter 1330 and amplifier 1315 is the currently tested segment, but a change of signature was not detected at block 1405, and previously a change was detected at the segment connected between amplifier 1312 and combiner/splitter 1330, than the segment connected between combiner/splitter 1330 and amplifier 1316 may be selected for testing by block 1408. Alternatively, if both segments connected between combiner/splitter 1330 and amplifiers 1315 and 1316, respectively, were tested and no signature change was detected, than the segment between combiner/splitter 1330 and amplifier 1312 may be recorded as the location of the access device of interest by block 1407. Location of the access device would then be narrowed down to tap 1355 and the access devices in group 1354.

Returning to block 1409, if a change in the signature of a previously selected segment was not detected, then block 1411 determines if an alternate communication path exists according to the stored network map. For example if no segment of the communication path starting at amplifier 1308 is determined to include the access device of interest, the network map may indicate that another communication path starting at another optical node (not shown) may exist and include the access device of interest. If another communication path exists, then that communication path is selected in block 1412, and embodiment 1400 is repeated on the newly selected communication path starting at block 1401.

In block 1411, if an alternate communication path is determined not to exist, than embodiment 1400 ends at block 1413 where a failure to detect the access device is recorded. The recording of the failure may be performed autonomously by analyzer 53 or another computing device, and/or displayed on a display device.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention.

What is claimed is:

1. A method comprising:
   introducing a plurality of different distortions at a plurality of segments of a network, wherein a segment of the plurality of segments is a wireless segment and a different segment of the plurality of segments is a fiber optic medium segment;
   determining, by a computing device, an approximation of an amplitude versus frequency response derived from a communication signal that traversed at least one segment of the plurality of segments; and
   comparing the approximation with one or more predicted responses to determine that the communication signal traversed at least one of the wireless segment and the fiber optic medium segment.

2. The method of claim 1, further comprising:
   approximating a location of a device on the network not authorized to access the network based on a location of at least one of the wireless segment and the fiber optic medium segment.

3. The method of claim 1, wherein at least one predicted response, of the one or more predicted responses, is based on a distortion, of the plurality of different distortions, introduced at the wireless segment.

4. The method of claim 1, wherein at least one predicted response, of the one or more predicted responses, is based on a distortion, of the plurality of different distortions, introduced at the fiber optic medium segment.

5. The method of claim 1, further comprising:
   determining a plurality of vector sign changes of the amplitude versus frequency response to determine the approximation.

6. The method of claim 1, wherein the communication signal is exchanged between a device and a communication hub, wherein the amplitude versus frequency response is a Fourier transform generated based on adaptive equalization coefficients specific to the communication signal exchanged between the device and the communication hub.

7. The method of claim 6, further comprising:
   mapping a geometric shape to at least a portion of the Fourier transform to produce the approximation.

8. The method of claim 1, wherein at least one of the plurality of different distortions results in a notch in the communication signal at a particular center frequency.

9. A method comprising:
   introducing a plurality of different distortions at a plurality of segments of a network, wherein a segment of the plurality of segments is a wireless segment and a different segment of the plurality of segments is a fiber optic medium segment;
   determining, by a computing device, an amplitude versus frequency response of a communication signal that traversed at least one of the wireless segment and the fiber optic medium segment;
   determining an approximation based on the amplitude versus frequency response; and
   determining, by the computing device, at least one of the wireless segment and the fiber optic medium segment as being traversed by the communication signal based on a comparison of the approximation associated with the communication signal with a plurality of predicted responses associated with the plurality of different distortions.

10. The method of claim 9, wherein a distortion, of the plurality of different distortions, is introduced by a band stop filter and decreases a signal-to-noise ratio of the communication signal.

11. The method of claim 9, wherein at least one predicted response, of the plurality of predicted responses, is based on a distortion, of the plurality of different distortions, introduced at the wireless segment.

12. The method of claim 9, wherein at least one predicted response, of the plurality of predicted responses, is based on a distortion, of the plurality of different distortions, introduced at the fiber optic medium segment.

13. The method of claim 9, further comprising:

approximating a location of a device on the network and not authorized to access the network based on a location of at least one of the wireless segment and the fiber optic medium segment.

14. A method comprising:

introducing a distortion at a wireless segment of a network and a different distortion at a fiber optic medium segment of the network;

determining, by a computing device, an amplitude versus frequency response of a communication signal that traversed at least one segment of the network;

determining an approximation based on the amplitude versus frequency response; and identifying at least one of the wireless segment and the fiber optic medium segment as being traversed by the communication signal based on a comparison of the approximation with a predicted response associated with the distortion introduced at the wireless segment and a predicted response associated with the different distortion introduced at the fiber optic medium segment.

15. The method of claim 14, further comprising:

approximating a location of a device on the network not authorized to access the network based on a location of the at least one of the wireless segment and the fiber optic medium segment.

16. The method of claim 14, further comprising:

determining a plurality of vector sign changes of the amplitude versus frequency response to determine the approximation.

17. The method of claim 14, wherein the distortion at the wireless segment results in a notch in the communication signal at a particular center frequency.

18. The method of claim 14, wherein the amplitude versus frequency response is a Fourier transform generated based on adaptive equalization coefficients specific to the communication signal exchanged between a device and a communication hub.

19. The method of claim 18, further comprising:

mapping a geometric shape to at least a portion of the Fourier transform to produce the approximation.

20. The method of claim 9, wherein at least one of the plurality of different distortions results in a notch in the communication signal at a particular center frequency.

* * * * *

UNITED STATES PATENT AND TRADEMARK OFFICE
CERTIFICATE OF CORRECTION

PATENT NO.         : 9,537,680 B2
APPLICATION NO.    : 14/591429
DATED              : January 3, 2017
INVENTOR(S)        : Lawrence D. Wolcott et al.

Page 1 of 1

It is certified that error appears in the above-identified patent and that said Letters Patent is hereby corrected as shown below:

In the Specification

Column 4, Detailed Description, Line 24:
Please delete "determined" and insert --determined.--.

Column 6, Detailed Description, Line 32:
Delete "53" and insert --52--.

Column 7, Detailed Description, Line 7:
Delete "thereof" and insert --thereof.--.

Column 8, Detailed Description, Line 59:
Delete "52" and insert --53--.

Column 10, Detailed Description, Line 31:
Delete "($\Delta_{min}$)" and insert --($\Delta y_{min}$)--.

Column 12, Detailed Description, Line 28:
Delete "Ax. and/or Ay$_{min}$" and insert --$\Delta x_{min}$ and/or $\Delta y_{min}$--.

Column 14, Detailed Description, Line 49:
Delete "50," and insert --53,--.

Column 14, Detailed Description, Line 64:
Delete "50" and insert --150--.

Signed and Sealed this
Thirteenth Day of February, 2018

Andrei Iancu
*Director of the United States Patent and Trademark Office*